(12) United States Patent
Cassagnol et al.

(10) Patent No.: US 6,385,727 B1
(45) Date of Patent: May 7, 2002

(54) APPARATUS FOR PROVIDING A SECURE PROCESSING ENVIRONMENT

(75) Inventors: Robert D. Cassagnol, Silver Spring; Douglas M. Dillon, Gaithersburg; David S. Kloper, Mt. Airy, all of MD (US); Sandra J. Weber, Pittsburgh, PA (US); Brandon E. Bautz, Bethesda, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/161,150

(22) Filed: Sep. 25, 1998

(51) Int. Cl.[7] ................................................ G06F 12/14
(52) U.S. Cl. ...................... 713/193; 713/166; 713/168; 713/194; 380/259
(58) Field of Search ................................. 713/164, 166, 713/168, 190, 193, 194; 380/259

(56) References Cited

U.S. PATENT DOCUMENTS

| | | |
|---|---|---|
| 4,734,568 A | 3/1988 | Watanabe |
| 5,432,950 A | 7/1995 | Sibigtroth |
| 5,467,396 A | 11/1995 | Schossow et al. |

FOREIGN PATENT DOCUMENTS

| | | | |
|---|---|---|---|
| EP | 0 262 025 A | 3/1988 | |
| GB | 2 205 667 A | 12/1988 | |
| WO | 96/00953 | * 1/1996 | .......... G06K/19/07 |

* cited by examiner

*Primary Examiner*—Albert Decady
*Assistant Examiner*—Paul E. Callahan
(74) *Attorney, Agent, or Firm*—John T. Whelan; Michael W. Sales

(57) ABSTRACT

An apparatus for providing a secure processing environment is disclosed. In one embodiment, the apparatus includes a read/write memory for storing encrypted information. It also includes a processor, a cipherer and an authenticator. The cipherer is in communication with the read/write memory for receiving encrypted information therefrom and is configured to decrypt the encrypted information into decrypted information to be returned to the memory for subsequent use by the processor. The authenticator authenticates the decrypted information prior to use by the processor and re-authenticates the information prior to re-encryption by the cipherer.

50 Claims, 10 Drawing Sheets

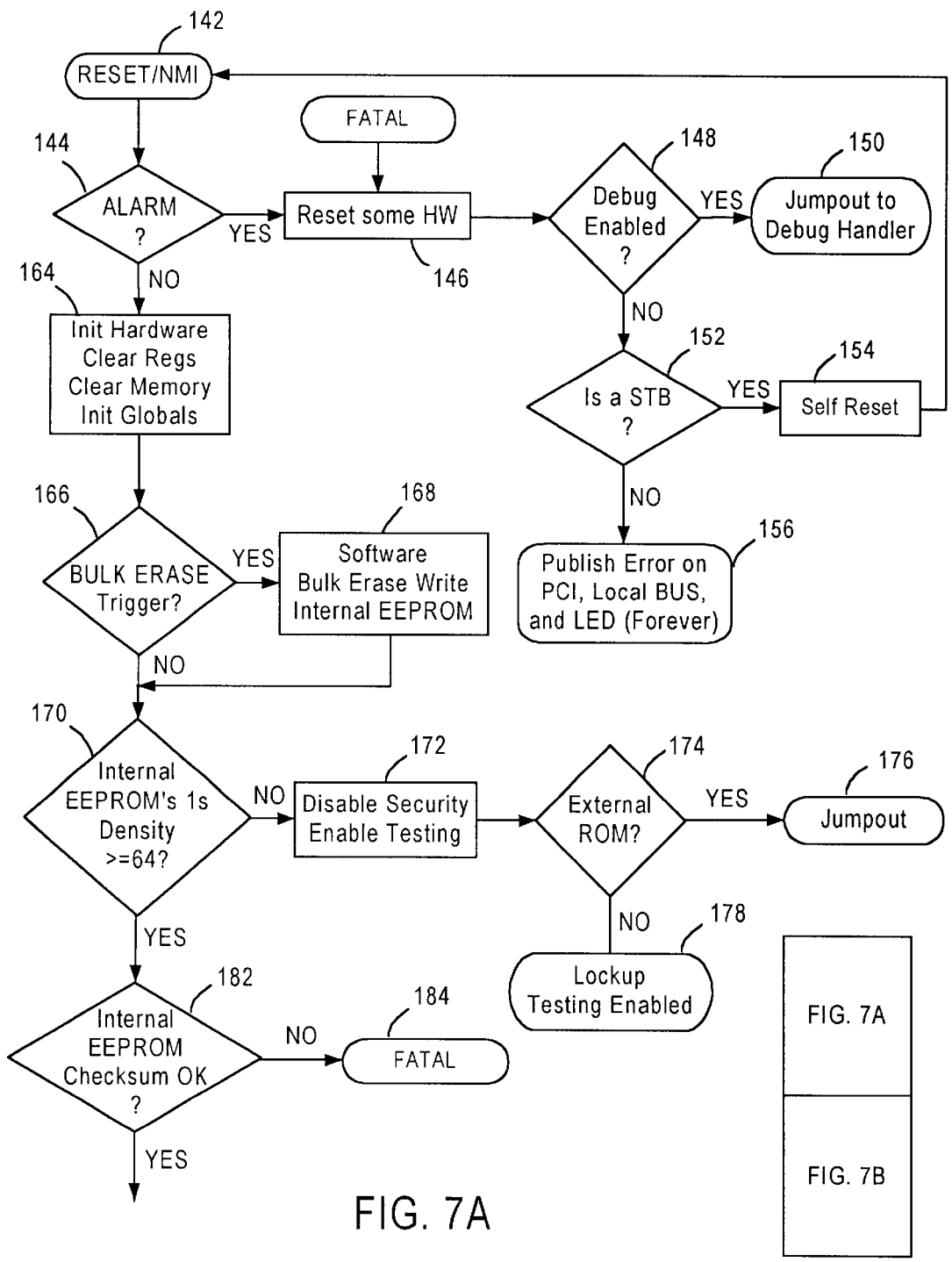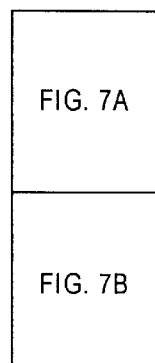
FIG. 7A
FIG. 7

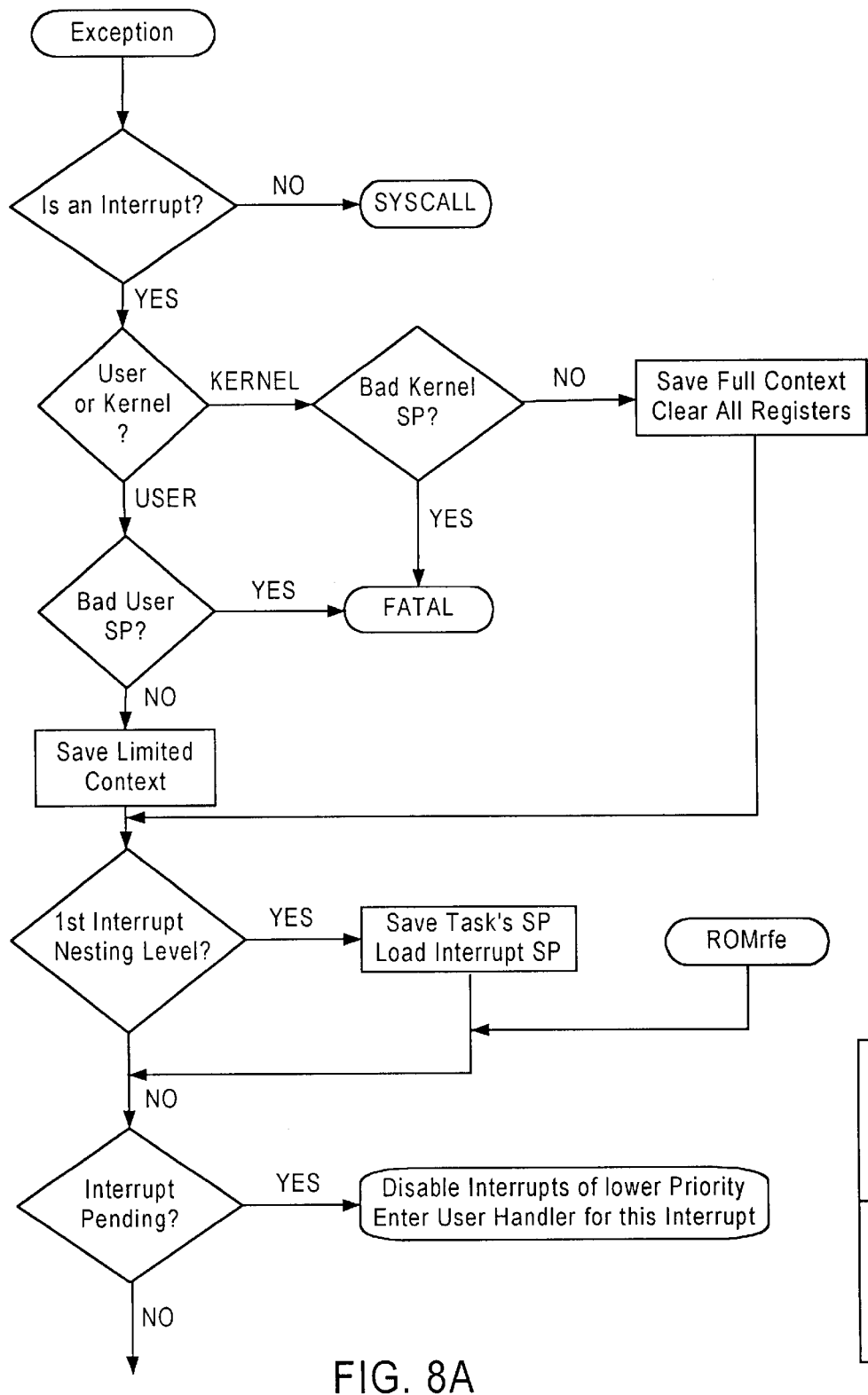
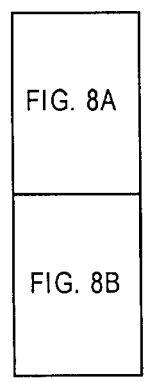
FIG. 8A
FIG. 8A
FIG. 8B
FIG. 8

APPARATUS FOR PROVIDING A SECURE PROCESSING ENVIRONMENT

FIELD OF THE INVENTION

The invention relates generally to security in programmed devices, and, more particularly, to an apparatus for providing a secure environment for processing confidential data and/or confidential programmed steps such as software and the like.

BACKGROUND OF THE INVENTION

The financial value of data and/or programmed instructions (e.g., software) is often dependent upon its general availability to the interested public. For example, if information in the form of data or programmed instructions is made available free of charge on the Internet, the commercial value of that information will quickly fall toward zero as few people will pay to receive something they can readily obtain for free. Thus, the desirability of maintaining the secrecy of data and/or programmed instructions with respect to all but paying purchasers of the secret information has long been known.

There are many contexts in which the concept of deriving value from information by limiting access thereto has been exploited. For example, conditional access broadcasting networks such as cable television networks and, more recently, direct satellite broadcasting networks are based on the premise of limiting access to broadcasted information to paying subscribers. Even more recently, the idea of limiting access to broadcasted data has been expanded to the computer networking context by Hughes Network Systems' DirecPC™ product. The DirecPC™ product broadcasts requested information to a requesting computing device (typically, a personal computer) via a satellite as a means to expedite information delivery from the Internet.

Most such broadcasting systems employ one or more cryptographic techniques to control access to the broadcasted information. For example, most such systems employ one or more keys to encrypt broadcasted data in accordance with a mathematical algorithm that makes it very difficult to decrypt the data in a reasonable amount of time absent knowledge of the key used to encrypt the data. An explanation of many such cryptographic techniques including an explanation of the Data Encryption Standard (DES) algorithm that is frequently employed to encrypt broadcasted information is contained in Schneier, Applied Cryptography, (Second Ed. 1996), which is hereby incorporated in its entirety by reference.

The need to protect the secrecy of information is not limited to the broadcasting context. There are many applications wherein it is important from, for example, a commercial standpoint to maintain the secrecy of information as it is locally processed by a personal computer. By way of example, not limitation, in some applications it is desirable to permit processing of secret data while maintaining the secrecy of the data to the outside world. By way of another example, in some instances it is desirable to permit secret execution of programmed instructions (e.g., software) within a processor without permitting access to the decrypted instructions themselves outside of the processor.

Various devices have been developed for maintaining the secrecy of information. However, since the secret information protected by these devices often have significant commercial value, a sub-culture of individuals commonly referred to as "hackers" has developed. These individuals spend considerable amounts of time attempting to frustrate or "hack" the security measures of these devices in an effort to usurp the commercial value of the secret information. The hackers have had varying levels of success in their efforts. Accordingly, there is a need for an improved, more flexible, apparatus for providing a secure environment for processing information which achieves a higher level of security against hackers than known devices. In addition, there is a need for such an apparatus that overcomes memory limitations inherent in secure devices and whose software can be upgraded in the field.

It is a well known assumption of accepted cryptographic practice that secrecy must reside entirely in the keys of the system. In other words, for a device to be deemed secure, an attacker having access to all information about the system except for the keys must still be unable to decrypt encrypted information in a reasonable amount of time. Thus, the secrecy of the key material is of paramount importance in a device for providing a secure environment.

To this end, devices for encrypting, decrypting and/or maintaining the secrecy of information typically include a secure memory of some type for storing key material and other possibly sensitive data. In order to control access to that key material, it is often necessary to limit access to the secure memory to trusted software and/or hardware components. More specifically, it is often necessary to place restrictions on when, who, and under what circumstances the memory storing key material can be addressed.

One problem with limiting access to a memory is testability. Another problem is limiting access to field deployed units while still allowing initial programming in the factory. In order to verify that the memory is functioning properly before releasing a device into the field, it is often necessary to have full read/write access thereto. Moreover, such access must typically be provided after a device is completely, or nearly completely constructed. As a result, such devices often include a testing mode wherein, upon occurrence of a certain condition or event, the device assumes it is in test mode and permits full read/write access to the memory. If a hacker is able to fool a device containing key material into entering the test mode, the hacker may potentially obtain full access to the stored key material thereby completely compromising the security of the device.

In some prior art approaches, one or more mode bits stored in memory, or in an anti-fuse device, or the like, define whether the memory contains confidential data and/or whether the memory is in the testing mode. This mode bit(s) may be implemented as a simple checksum on the data in memory. In other words, the mode bit(s) may be set to equal some mathematical function(s) of some or all of the data stored in memory. Regardless of which traditional method for defining the mode bit(s) is employed, if a hacker changes the state of the mode bit(s), the hacker can potentially cause the memory to unlock into the testing mode thereby compromising the key material it contains. Thus, it is desirable to provide an improved method and apparatus for determining whether a memory contains confidential data which is not dependent upon mode bit(s) stored in that memory or upon a checksum value stored in memory.

SUMMARY OF THE INVENTION

In accordance with an aspect of the invention, an apparatus for providing a secure processing environment is provided. The apparatus includes a read/write memory for storing information; a first processor cooperating with the read/write memory for reading information therefrom and writing information thereto; and a cipherer in communication with the read/write memory. The cipherer is configured to selectively decrypt encrypted information into decrypted information and to deliver the decrypted information to the read/write memory for subsequent use by the first processor. The apparatus is further provided with an authenticator for authenticating the decrypted information prior to use by the first processor.

In some embodiments, the authenticator re-authenticates decrypted information received from the read/write memory, and the cipherer is configured to selectively encrypt the decrypted, re-authenticated information into re-encrypted information. In such embodiments, the cipherer may optionally return the re-encrypted information to the read/write memory for subsequent exportation to a storage device or may optionally directly export the re-encrypted information. Also in such embodiments, the cipherer preferably re-encrypts the decrypted, re-authenticated information such that it differs from its original encrypted form to mask modification information. In such embodiments, the cipherer employs key-cycling and/or cycling of the whitening key to mask the modification information.

In some embodiments, authentication data employed to re-authenticate the decrypted information prior to re-encryption is stored in the read/write memory for subsequent use in authenticating the decrypted information.

In some embodiments, the first processor has a kernel mode of operation and a user mode of operation, and the kernel mode and the user mode define separate security cells. In such embodiments, the first processor preferably executes non-secure software in the user mode of operation and secure software in the kernel mode of operation.

In some embodiments, the apparatus is provided with a second processor. The second processor is in communication with the cipherer and with the read/write memory to thereby selectively initiate decryption and re-encryption of information stored in the read/write memory. In some such embodiments, the cipherer comprises the authenticator.

In some embodiments, the apparatus is further provided with a non-volatile memory and a logic circuit for controlling access to the data contained in the non-volatile memory, wherein the logic circuit selectively accesses the non-volatile memory to determine whether the data contained in the non-volatile memory comprises confidential data by analyzing a property inherent in the accessed data. In some such embodiments, the logic circuit determines whether the data contained in the non-volatile memory comprises confidential data by identifying data blocks in the accessed data having a predetermined characteristic, by counting the identified data blocks, and by comparing the count to a threshold value. In some such embodiments, each of the data blocks may comprise a bit and the predetermined characteristic may comprise a predefined logic state. Alternatively, each of the data blocks may comprise a plurality of bits, and the predetermined characteristic may comprise a binary value falling within a range of binary values.

In some embodiments which employ a non-volatile memory as described above, a key isolation circuit is provided directly connecting the logic circuit to the cipherer. In some such embodiments, the non-volatile memory stores a key, and the key isolation circuit delivers the key to the cipherer. In any of the foregoing embodiments, the logic circuit, the key isolation circuit and the cipherer preferably define a closed system.

In some embodiments, the non-volatile memory, the first processor, the read/write memory, and the cipherer are embedded on an integrated circuit. In such embodiments, the integrated circuit includes pins for connecting the apparatus to external devices, and the apparatus further comprises a silencing circuit for selectively disabling the pins to avoid disclosure of sensitive information outside the secure environment, and/or the apparatus further comprises a watchdog circuit adapted to monitor the integrated circuit for tampering.

In some embodiments, the apparatus includes a memory management unit cooperating with the first processor for maintaining a plurality of security cells.

In some embodiments, the cipherer comprises a crypto-module.

In any of the foregoing embodiments, the authentication may be performed by authenticating the encrypted information prior to decryption.

In any of the foregoing embodiments, the encrypted information may comprise encrypted processor instructions and/or encrypted data.

In any of the foregoing embodiments, the encrypted information may be segmented into sections. In such embodiments, the segments are preferably independently encrypted and authenticated.

In accordance with another aspect of the invention, an integrated circuit for providing a secure processing environment is provided for use with an external memory. The apparatus includes a volatile memory having a storage capacity which is less than the storage capacity of the external memory. The apparatus further comprises import/export means for selectively importing and exporting encrypted information between the external memory and the volatile memory; and cipher means for decrypting encrypted information received from the volatile memory into decrypted information within the secure environment and for encrypting the decrypted information back into encrypted information within the secure environment. In addition, the apparatus includes a processor for processing the decrypted information within the secure environment. The processor cooperates with the import/export means to selectively import and export decrypted information from the external memory to the volatile memory and vice versa to avoid exceeding the second storage capacity.

In some embodiments, the cipher means encrypts information such that encrypted information corresponding to decrypted information has a first form when imported from the external memory and a second form different from the first form when exported to the external memory even when the corresponding decrypted information is unchanged. In some such embodiments, the cipher means decrypts encrypted information using a first whitening key and encrypts decrypted information using a second whitening key different from the first whitening key. In some such embodiments, the apparatus is provide with a cryptographically strong pseudo random number generator that generates the second whitening key.

In some embodiments, the apparatus includes means for authenticating the decrypted information within the secure environment. In some such embodiments, the authenticating means authenticates the decrypted information after importation from the external memory and re-authenticates the decrypted information prior to encryption and exportation to the external memory.

In accordance with an aspect of the invention, a method for tamper checking an integrated circuit for performing secure operations is provided. The method comprises the steps of: detecting an event; executing a built in self test on at least one element of the integrated circuit to determine if a tamper has occurred; and if the built in self test indicates a tamper has occurred, placing a restriction on at least one operation of the integrated circuit.

In some embodiments, the method also includes the steps of: holding a processor associated with the integrated circuit in a reset state such that a predefined memory storing key material cannot be accessed; if the at least one element passes the built in self test, releasing the processor from the reset state; and if the at least one element fails the built in self test, holding the processor in the reset state. In some such embodiments, the at least one element comprises the predetermined memory, and/or the at least one element comprises a logic circuit.

In any of the foregoing embodiments, the detected event may comprise a reset event.

Other features and advantages are inherent in the apparatus claimed and disclosed or will become apparent to those skilled in the art from the following detailed description and its accompanying drawings.

DESCRIPTION OF THE PREFERRED EMBODIMENTS

Figure 1:
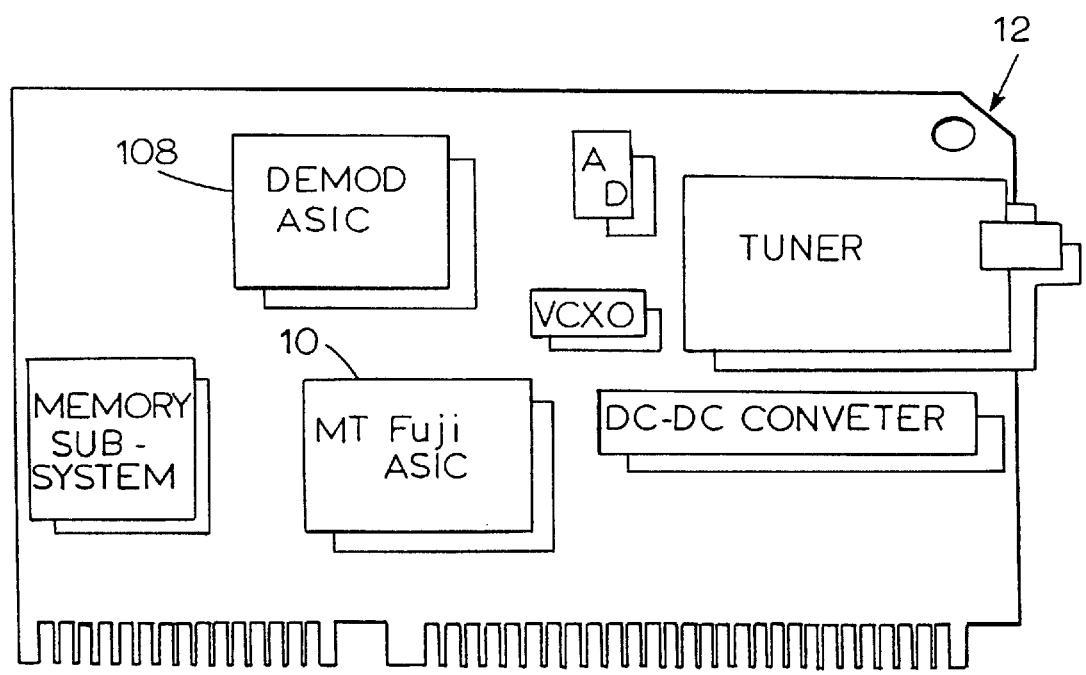
FIG. 1 is an illustration of an apparatus constructed in accordance with the teachings of the invention in one possible environment of use.

An apparatus 10 constructed in accordance with the teachings of the invention is schematically illustrated in FIG. 1 in one possible environment of use, namely, on a DirecPC™ module 12 for use in a personal computer (not shown). As explained in detail below, the apparatus 10 is constructed to provide a secure environment for processing sensitive information. As used throughout this description and appended claims, the term "information" refers to data, programmed instructions (e.g., software, firmware) or both. Although the apparatus 10 is capable of use in the DirecPC™ product, persons of ordinary skill in the art will appreciate that the apparatus 10 is not limited to use in any specific environment or with any specific application. On the contrary, without departing from the scope or spirit of the invention the illustrated apparatus 10 can be used in any application or environment which would benefit from the enhanced processing security it provides. For example, it would be especially advantageous in smart card applications. Further, although the apparatus 10 is illustrated in FIG. 1 as being implemented as an application specific integrated circuit (ASIC), persons of ordinary skill in the art will readily appreciate that the apparatus 10 need not be constructed as an integrated circuit.

As explained below, the illustrated apparatus 10 is adapted to provide a secure environment in which sensitive information can be decrypted, processed, and re-encrypted without exposing the content of the sensitive information outside of the apparatus 10. (As used herein "decrypted" means at least one layer of encryption is removed. As will be appreciated by persons of ordinary skill in the art, "decrypted information" as used herein may optionally still be encrypted, but will be at least one step closer to its completely unencrypted form. For example, the VersaCrypt environment can be used to import other crypto systems such as RSA decrypted data that is encrypted or in the process of being decrypted in accordance with the other crypto systems.) In one respect, the illustrated apparatus 10 achieves this security by strictly ensuring that the sensitive information is always encrypted when exposed outside of the secure environment. At all times when decrypted sensitive information is available in the apparatus 10, security measures are enforced to prevent access to the apparatus 10 by external devices.

Of course, in some applications it is desirable to export the decrypted information out of the apparatus 10 while maintaining the secrecy of the processes and key(s) used to decrypt the information. For example, in a software metering application used to meter access to a database, it would be desirable to provide decrypted contents of the database to authorized users once they have been properly charged. In such applications, the apparatus 10 provides a secure environment for decrypting the data which hides the key material employed, and the processes performed during decryption.

While the illustrated apparatus 10 is very valuable in conditional data access applications such as a television subscriber broadcast system, the full capabilities of the apparatus 10 are more fully utilized in conditional software access applications. In such applications, the illustrated apparatus 10 can decrypt, execute and re-encrypt sensitive software (or firmware) without exposing the decrypted instructions outside the secure environment. The encrypted software (or firmware) may optionally be stored in the apparatus 10, or, due to memory constraints, may be stored outside the apparatus 10 and selectively imported (either collectively or in segments) into the apparatus 10 as needed. In either event, since, as explained below, the illustrated apparatus 10 is provided with significant on-board processing capacity, the execution of the decrypted software (or firmware) can occur completely in the secure environment. As a result, the sensitive software (or firmware) cannot be easily changed or pirated for use by an unauthorized entity or to induce non-conformant operation.

While execution of the encrypted software (or firmware) may cause the apparatus 10 to output information to an external device (e.g., a monitor, a printer, a storage device, etc.) in a form where it can be read by a user, the software generating the output information would not ordinarily be exposed outside the secure environment provided by the apparatus 10 (absent, of course, instructions in the executed software (or firmware) to export the instructions in decrypted form). Thus, the security of the software (or firmware) is always maintained by the illustrated apparatus 10. As explained below, a valuable result of this aspect of the illustrated apparatus 10 is the ability to implement software (or firmware) metering wherein a user of licensed software (or firmware) can be charged on a usage basis which is keyed, for example, to the amount of time the software (or firmware) is actually used. For example, the apparatus 10 can be adapted to monitor the amount of time any portion of the subject software (or firmware) is maintained in decrypted form. The data collected by this monitoring can be employed to assess licensing fees for software (or firmware) usage. This approach to licensing software (or firmware) is in sharp contrast to traditional methods where, absent upgrades, a one-time license fee is charged.

Figure 2:
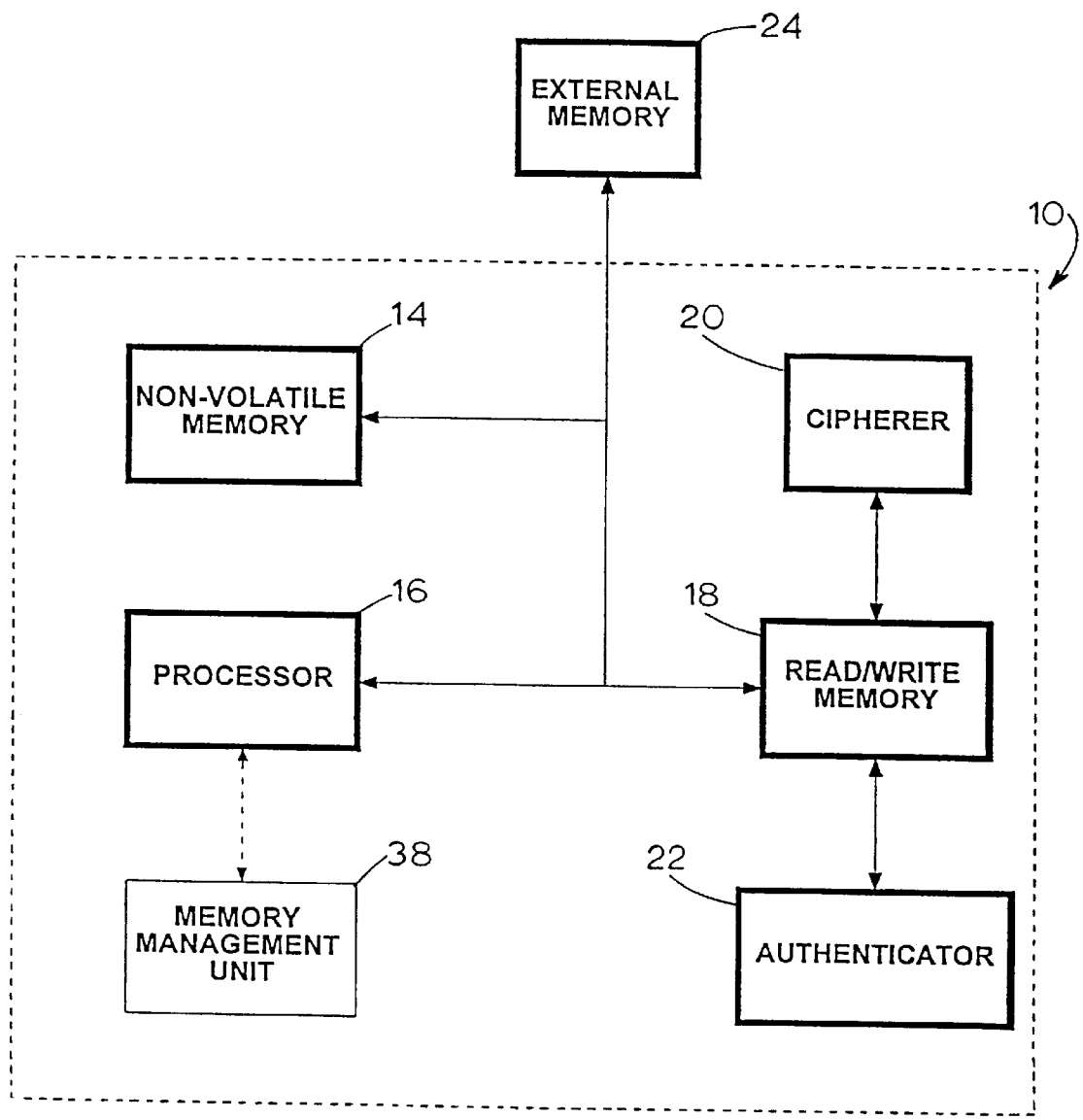
FIG. 2 is a schematic illustration of the apparatus of FIG. 1.

For the purpose of storing programmed instructions that define some of the operations of the apparatus 10 (i.e., "the secure kernel"), the apparatus 10 is provided with a non-volatile memory 14 (FIG. 2). The secure kernel is in charge of resource management within the apparatus 10. It enforces many of the security limitations discussed below. Although the code stored in the non-volatile memory 14 is preferably not encrypted, persons of ordinary skill in the art will appreciate that encrypted information (e.g., data or programmed instructions) can be stored in the non-volatile memory 14 without departing from the scope or spirit of the invention. Although it will be appreciated that the non-volatile memory 14 can be implemented in many ways without departing from the scope of the invention, in the presently preferred embodiment the memory 14 is implemented by a read only memory (ROM) storing programmed instructions. As explained below, the apparatus 10 runs secure software which is preferably segmented into VersaCrypt applets which are individually encrypted using triple key, triple DES-CBC with whitening.

For the purpose of processing information and for controlling the operations of the apparatus 10, the apparatus 10 is provided with a processor 16 (see FIG. 2). As explained in further detail below, one function of the processor 16 is to enforce at least two security cells. A first one of the security cells, which is referred to herein as the kernel mode cell, is preferably enforced whenever sensitive confidential information is being accessed, processed, or made available on an internal bus of the apparatus 10. The second security cell, which is referred to herein as the user mode cell, is enforced wherein no access to sensitive data is permitted. When the kernel mode is in effect, the processor 16 places no restrictions on access to the hardware and software resources within the apparatus 10. As explained below, it also preferably prevents the external pins of the apparatus 10 from revealing sensitive information indicative of operations being performed by the apparatus 10 and/or of the information being processed by the apparatus 10. When the user mode is enforced, the processor 16 places an enhanced level of restrictions on operations within the apparatus 10, but no restrictions on which operations are externally visible. However, as explained below, certain hardware enforced restrictions are preferably maintained in both security cells.

In order to temporarily store information to be processed by the apparatus 10, the apparatus 10 is further provided with a volatile read/write memory 18. The read/write memory 18 is addressable by the processor 16 such that the processor 16 can both read information contained in the memory 18 and write information to the memory 18 as needed. As explained further below, in operation, encrypted information to be processed by the apparatus 10 is first written to the read/write memory 18. Thus, in one capacity, the read/write memory 18 serves as a storage area for encrypted information.

To perform the ciphering functions, the apparatus 10 is provided with cipher means for decrypting encrypted information into decrypted information and for re-encrypting decrypted information into encrypted information. Both of these functions are performed within the secure environment. As will be appreciated by persons of ordinary skill in the art, the cipher means can be implemented in many different ways without departing from the scope or spirit of the invention. For example, the cipher means can be implemented by a cipherer 20 such as a dedicated hardware circuit or a processor executing software or firmware. Moreover, persons skilled in the art will appreciate that the cipherer 20 can be adapted to perform a wide variety of well known cryptographic techniques and/or algorithms without departing from the scope or spirit of the invention. In the presently preferred embodiment, the cipherer 20 is implemented by a dedicated hardware circuit 20 referred to herein as a crypto-module which is capable of performing both (1) triple key, triple DES/ECB encryption and decryption (triple key, triple Data Encryption Standard/Electronic Code Book Mode encryption/decryption), (2) triple key, triple DES outer CBC (triple key, triple Data Encryption Standard with outer Cipher Block Chaining) encryption and decryption, and (3) DVB (Digital Video Broadcasting) descrambling depending on the requirements of the application.

As shown in FIG. 2, the cipherer 20 is in communication with the read/write memory 18. In operation, encrypted information written to the read/write memory 18 is transferred to the cipherer 20 for decryption as needed. The decrypted information is then written from the cipherer 20 to the read/write memory 18 for subsequent use by the processor 16.

Significantly, to prevent hackers from modifying code or sensitive data to their own ends, the processor 16 is not permitted to process information which has been decrypted by the cipherer 20 until the decrypted information has been authenticated. To this end, the apparatus 10 is provided with an authenticator 22. Although persons of ordinary skid in the art will appreciate that the authenticator 22 could employ any of a large number of authentication algorithms to authenticate the decrypted information, in the preferred embodiment, the authenticator performs a CBC-MAC (Cipher Block Chain Message Authentication Code) algorithm which employs a secret key to authenticate all decrypted information. As will be appreciated by persons of ordinary skill in the art, such authentication requires knowledge of an expected MAC value for each section of encrypted information that must be separately authenticated. As will be explained further below, in the preferred embodiment, the required MAC values are imported into the read/write memory 18 at start-up, although other load time schemes could be employed without departing from the scope or spirit of the invention. The authenticator utilizes the MAC values from the memory 18 to perform CBC-MAC authentication on all decrypted information prior to usage by the processor 16.

The contents of the read/write memory 18 may have been updated by the processor 16, or by other means, in the course of executing the VersaCrypt applet. Significantly, if the decrypted information is to be re-encrypted and exported (as explained below), the authenticator 22 re-authenticates the decrypted information currently resident in the read/write memory 18 by developing a new CBC-MAC value for that information block. The new CBC-MAC value is written to the read/write memory 18 for subsequent use in authenticating the subject information block should it become necessary to decrypt and re-use that information in the future. Re-authentication is necessary because, at least in some instances, the processor 16 will change the content of the decrypted information during processing. Since any change in the content of the decrypted information will (with high probability) cause that information block to have a different CBC-MAC value, unless the CBC-MAC value is updated through re-authentication, the authenticator 22 will be unable to authenticate the subject information should a future call to the updated information be required. As will be appreciated by persons of ordinary skill in the art, there are many possible ways of verifying that the authenticated version is in fact the most recently exported version. Any such other verification approach can be used without departing from the scope or spirit of the invention.

After re-authentication, the cipherer 20 re-encrypts the decrypted, re-authenticated information in the read/write memory 18 into re-encrypted information.

As will be appreciated by persons of ordinary skill in the art, in many applications the amount of encrypted information to be processed by the apparatus 10 will exceed the internal memory capacity of the apparatus 10. To enable the apparatus 10 to operate in such circumstances, the apparatus 10 is provided with import/export means for selectively importing and exporting encrypted information between an external device such as memory 24 and the read/write memory 18. Persons of ordinary skill in the art will, however, appreciate that the encrypted information could be imported and exported over an internal bus in the system, over a Lan or Wan network connection, to a hard drive, or to another storage media or communications device without departing from the scope or spirit of the invention. The storage capacity of the external memory 24 preferably exceeds the storage capacity of the read/write memory 18. The import/export means cooperates with the processor 16 to import encrypted blocks of information from the external memory 24 on an as needed basis. Once imported to the read/write memory 18, the encrypted information is decrypted by the cipherer 20 and authenticated by the authenticator 22 as explained above. The processor 16 can then process the decrypted information. When the processor 16 is finished with the information block (at least for the near future), the decrypted information (with any processing changes that were effectuated) is re-authenticated by the authenticator 22, re-encrypted by the cipherer 20 and exported to the external memory 24 via the import/export means.

Although persons of ordinary skill in the art will appreciate that the import/export means can be implemented in many ways without departing from the scope or spirit of the invention, in the illustrated embodiment it is implemented by a bus having one or more external connections.

As will be appreciated by persons of ordinary skill in the art, in applications where the encrypted information is stored in an external memory 24, unless precautions are taken, hackers would be able to discern information about which blocks are modified and when those blocks are modified, and this information could be used in statistical attacks. Such information could potentially aid hackers attempting to pirate the encrypted information. In order to avoid this result, the cipherer 20 of the apparatus 10 is preferably adapted to perform key cycling on the whitening key.

In essence, whitening performs a mathematical operation (such as an exclusive-or operation) to combine a whitening key with an information block to, in effect, further strengthen key material. The whitening process can be performed on an encrypted information block and the corresponding decrypted information block (i.e., both before and after encryption occurs). A benefit of using this technique in the illustrated apparatus 10 is that encrypted blocks of information will always look different when exported (from previous import/export sequences) regardless of whether the content of the decrypted information has been changed. In other words, in the illustrated apparatus 10, the cipherer 20 re-encrypts the decrypted, re-authenticated information such that it differs from its original encrypted form to thereby mask modification information as to whether the content of the decrypted information was modified while in the secure environment provided by the apparatus 10. Thus, the cipherer 20 encrypts information such that encrypted information corresponding to the decrypted information has a first form when imported from the external memory 24 and a second form which is different from the first form when it is exported to the external memory 24, even when the corresponding decrypted information is unchanged. Because of this technique an attacker is denied the possibility of a known plaintext attack as the plaintext is not known, is denied the possibility of a known cipher text attack in that the cipher text is not known, is denied the possibility of an adaptive chosen plaintext attack in that he is denied control of the plaintext, and an attacker is incapable of mounting a statistical attack against the whitening key as it is changed with each export operation, and so has a sufficiently short lifetime. Other approaches can, of course, be used to this end including, for example, key cycling of the DES keys, or package transforms.

To ensure the whitening effect is present for substantially every import/export operation performed on a given information block, the cipherer 20 is adapted to perform key cycling with respect to the whitening key. More specifically, the cipherer 20 is arranged to use a new whitening key for every section of information that it encrypts. Thus, when a previously exported block of encrypted information is imported from the external memory 24, the whitening key used in the previous import/export cycle is used by the cipherer 20 in the decryption process. Then, when that same block of information is to be exported, the cipherer 20 uses a new whitening key to perform the whitening portion of the encryption process.

As will be appreciated by persons of ordinary skill in the art, in order to efficiently decrypt an information block that has been whitened with a whitening key, the cipherer 20 must be provided with the whitening key. Since a new whitening key is preferably used for every block of exported encrypted information, storing the whitening keys internally would quickly deplete the memory resources of the apparatus 10. To avoid this result, in the presently preferred embodiment, an encrypted version of the whitening key is written to a predetermined location in the corresponding whitened, encrypted information block and, thus, is exported and stored with the encrypted, whitened information block in the external memory 24. Thus, when an encrypted information block is imported, the cipherer 20 retrieves the whitening key from the known predetermined location in the block and uses the whitening key in the decryption process. Since the encrypted whitening key is resident inside the block, it is explicitly covered by the authentication with the rest of the block. Although in the illustrated embodiment the whitening keys are stored externally to the apparatus 10 to preserve memory resources, persons of ordinary skill in the art will appreciate that an enhanced level of security can be obtained by storing the whitening keys internally to the apparatus 10 in a manner that maps the stored whitening keys to the exported information blocks (as is done with the authentication information as explained above). Such an approach to whitening key management can, of course, be employed without departing from the scope or spirit of the invention.

As will be appreciated by persons of ordinary skill in the art, since, in the illustrated embodiment, the CBC-MAC values for the exported information blocks are stored in the volatile read/write memory 18, should there be a power failure, or should some other re-set condition occur, the CBC-MAC values in the memory 18 will be lost. If the CBC-MAC values are lost, the authenticator 22 will be unable to authenticate the exported information blocks upon re-importation and, thus, unless precautions are taken, an error condition will result. Due to these circumstances, persons of ordinary skill in the art will appreciate that, unless a permanent store such as a fault tolerant system is provided for the modified CBC-MAC values, the original encrypted information blocks must be preserved and used at start-up along with the original CBC-MAC values. As explained above, in the illustrated apparatus 10 the CBC-MAC values for the encrypted information blocks in their original form are permanently stored in an external memory (e.g., ROM 142 in FIG. 3) and are loaded from the memory 14 to the read/write memory 18 as part of a start-up process. Thus, whenever the apparatus 10 is re-set, the CBC-MAC values in the read/write memory 18 are likewise restored to their original values. As a result, in the illustrated embodiment, processing always begins with the original encrypted information blocks to ensure processing starts at a well known, trusted state.

As will be appreciated by persons of ordinary skill in the art, the above approach to CBC-MAC value handling implies that previous modifications to the encrypted information will be lost. This does not imply, however, that the results of previous operations will necessarily be lost. Instead, non-volatile storage storing data modified in previous uses of the apparatus 10 can be stored in permanent storage devices off the apparatus 10 and imported as needed. This non-volatile storage can store information in encrypted or decrypted form, as dictated by the application. If stored in encrypted and or authenticated format, the authentication information for such information must either be stored internally via some non-volatile storage or stored outside the apparatus 10 on some non-volatile storage and imported for use as needed. Internal storage is preferred.

The illustrated apparatus 10 encrypts all of the encrypted information blocks via a triple key, triple DES CBC with whitening algorithm. In the preferred embodiment, a key hierarchy is employed. The information blocks are encrypted via a triple DES process keyed with the session key. Thus, the session key is required to decrypt any of the information blocks processed by the system. To obtain the session key, one must have access to the master key. To obtain the master key, one must have access to the device key. Thus, maintaining the secrecy of the device key is of paramount importance in protecting the service environment created by the apparatus 10 against hackers. As explained in further detail below, the unencrypted forms of the device, master and session keys are available only in the cipherer 20 and the cipherer's key facility. They preferably are not accessible by the processor 16 at any time. It is also preferable to store the device key in a scrambled form, and to protect that key via the diffuse checksum process described herein.

As used herein, "DK" refers to the device key; "MK" refers to the master key; "SK" refers to the session key'; "EMK" refers to the encrypted master key (i.e., the master key encrypted with the device key); and "ESK" refers to the encrypted session key (i.e., the session key encrypted with the master key).

As mentioned above, a major security issue for the apparatus 10 is preserving the secrecy of the keys employed in the device 10. The keys must be stored in a memory somewhere in the apparatus 10. However, hackers will very likely attempt to read the key material from that memory in an effort to frustrate the secure environment. Therefore, it is imperative to include an apparatus for controlling access to confidential data such as key material stored within the apparatus 10.

Figure 3:
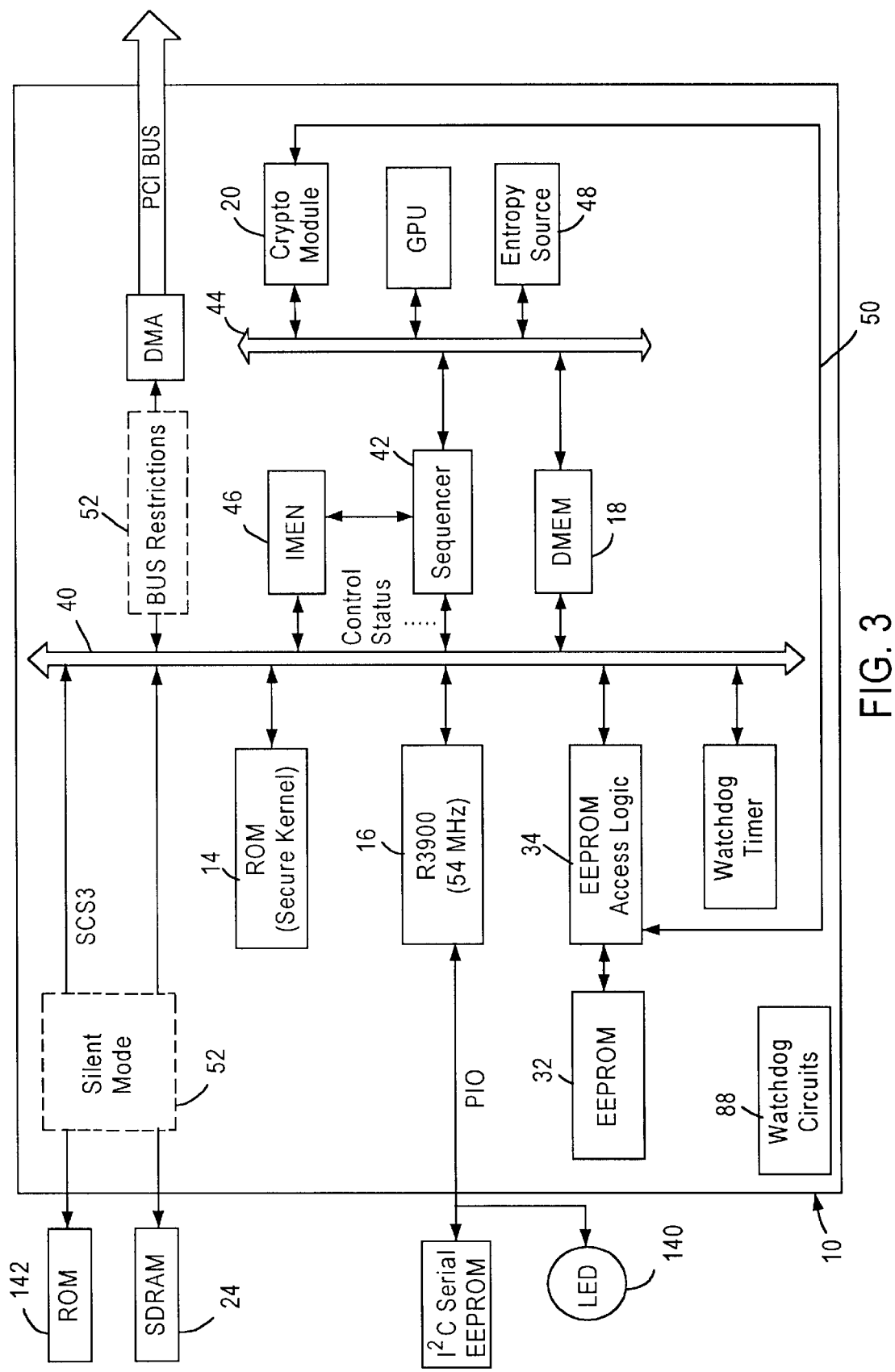
FIG. 3 is a more detailed schematic illustration of the apparatus of FIGS. 1 and 2.

A more detailed block diagram of the illustrated apparatus 10 is shown in FIG. 3. As shown in that figure, the apparatus 10 is provided with a device 30 including a non-volatile memory 32 for storing data and means for controlling access to the data contained in the memory 34. The non-volatile memory 32 is implemented as an EEPROM in the illustrated apparatus 30. However, persons of ordinary skill in the art will readily appreciate that other types of memory devices could be used in this role without departing from the scope or the spirit of the invention. Similarly, although the control means could be implemented by a logic circuit 34 such as a hardware circuit including a number of logic gates configured to perform predefined functions upon the occurrence of predetermined conditions, persons of ordinary skill in the art will readily appreciate that the logic circuit 34 could be implemented in many ways without departing from the scope or spirit of the invention. For example, in the preferred embodiment the logic circuit 34 is implemented by the programmed processor 16.

The logic circuit 34 is adapted to access the memory 32 to determine whether at least a portion of the data contained in the memory 32 comprises confidential data. The logic circuit 34 makes this determination by analyzing a property inherent in the data. More specifically, in the illustrated device 10, the logic circuit 34 identifies and counts any data blocks in the memory 32 having a predetermined characteristic. It then compares the counted number of data blocks to a threshold value. The logic circuit 34 uses the results of this comparison as an indication of the presence or absence of confidential data in the memory 32.

By way of a more specific example, data stored in the memory 32 is represented by a series of bits; each of which has a logic state of "1" or "0" as is conventional. In the illustrated apparatus 10, the logic circuit 34 is constructed to count the number of bits in the memory 32 having the logic state "1". The counted number is then compared to a predetermined threshold number. If that comparison indicates that there are more than the threshold number of bits with logic state "1" in the memory 32, the logic circuit 34 assumes confidential data is stored in the memory and limits access thereto. If the comparison indicates that less than the threshold number of bits in the memory 32 have the logic state "1", the logic circuit 34 assumes that no confidential data is present and removes the restrictions placed on accessing the memory 32. This process of identifying and counting data blocks with a predetermined characteristic and of comparing the counted blocks to a threshold is referred to herein as the "diffused checksum process".

It is important to note that the determination as to whether or not confidential data is present in the memory 32 is based on an inherent property of the data in the memory 34 itself. In contrast, in prior art techniques, the determination of whether or not confidential data is present in a memory was often performed by reading the state of one or more flag bit(s) stored in the memory. In such prior art devices, the flag bit(s) are set to a first state when no confidential data is present and to a second state when confidential data is present. These prior art approaches are disadvantageous because the entire lock/unlock decision for the memory is based upon the state of a relatively small number of bits (sometimes only one), and those bit(s) do not constitute the protected data or a real indication of its presence. Hackers often attempt to exploit these prior art approaches by changing the state of the flag bit(s) by, for example, damaging the memory or inducing false reads. If the hackers succeed in changing the state of the flag bit(s), they can convince these prior art devices that no confidential data is present when in fact such confidential data is stored in the memory to thereby obtain access to the confidential data.

In sharp contrast, in the illustrated apparatus 30, there are no flag bit(s) that control the lock/unlock decision. Thus, damaging or otherwise changing the content of a small portion of the memory 32 will not be sufficient to unlock the device. Instead, if a suitably low threshold value is selected, the state of nearly all of the data in the memory 32 must be changed to convince the logic circuit 34 that no confidential data is present. Moreover, since the data that is used to identify the presence of confidential data is the confidential data itself, changing the state of this data sufficiently to unlock the memory 32 will preferably destroy substantially all of the confidential data stored in the memory 32. In other words, a change in the inherent property sufficient to cause the logic circuit 34 to determine that no confidential data is stored in the memory 32 substantially destroys the data in the memory 32. As a result, if the thresholds are properly set for the application, there should be insufficient confidential data in memory to mount a successful attack. Another way to look at this is, the detection of confidential data is tied to the presence of confidential data itself, rather than some artificial metric.

As will be appreciated by persons of ordinary skill in the art, the diffused checksum process described above may be performed on either the entire memory 32 or on a section of the memory 32 without departing from the scope or spirit of the invention. Moreover, persons of ordinary skill in the art will appreciate that, although the threshold value can be set to any desired value without departing from the scope or spirit of the invention, preferably the threshold value is set to a relatively low level. In an ideal world, the threshold would be set to one such that all confidential data would have to be destroyed before the apparatus would unlock. But to permit testing, a tradeoff between security and testability must be made in selecting the threshold value. Indeed, in the illustrated apparatus, the controlled portion of memory 32 is 3K bits and the threshold value is set to 64 bits. Persons of ordinary skill in the art will appreciate that the threshold value can be set to any desired level without departing from the scope or spirit of the invention. Preferably, the threshold value is selected based on a determination as to what would be an acceptable level of disclosure without unacceptably compromising the security of the system.

In addition, persons of ordinary skill in the art will appreciate that, although in the illustrated apparatus 10, the data blocks counted by the logic circuit 34 are bits having a logic state of "1", the logic circuit 34 could be implemented to count bits having logic states "0", or to count data blocks comprising a plurality of bits having some property such as a binary value falling within a predetermined range of binary values (e.g., between 00000010 and 00010001) without departing from the scope or spirit of the invention.

An inherent tension present in the illustrated apparatus 10, 30, lies between the need for security and the need for testability and initial programability. More specifically, while as discussed above, it is essential to control access to the repository of the key material used to decrypt/encrypt information blocks (i.e., memory 32), it is equally crucial to permit testing of that memory 32 before sale of the product and, in the event of a returned product, after a sale has occurred and the apparatus 10 has been used in the field. Testing often requires reading and writing to the memory 32. Therefore, permitting testing is adverse to maintaining the secrecy of data stored in the memory 32.

In the illustrated apparatus 10, testing can only be conducted after the diffused checksum test discussed above indicates that no confidential data is present in the memory 32.

With respect to returned units and the like that have already been programmed with confidential data, testing can only be performed by first erasing the memory 32. Thus, the apparatus 10 is provided with a means to trigger erasure of the memory 32 through a controlled process as describe below.

The erasure method can also be used as a tamper response if so desired by the application.

To prevent hackers from obtaining access to confidential data within the memory 32 by triggering partial erasures of the memory (for example, by triggering erasure and then quickly terminating power to the apparatus), the logic circuit 34 is constructed to respond to an erasure trigger to erase the memory 32 by replacing the data blocks originally stored in the memory 32 with intermediate data blocks having one or more intermediate values before erasing the memory 32 to a final state. The intermediate value(s) are selected to ensure that the number of data blocks with the inherent property stored in the memory 32 remains at a level which causes the logic circuit 34 to indicate the presence of confidential data until after all of the confidential data is destroyed. The logic circuit 34 erases the memory 32 to the final state by replacing the intermediate date blocks stored in the memory with final data blocks having one or more final values.

More specifically, in the illustrated apparatus 10, 30, the logic circuit 34 erases the memory 32 in three stages. In a first stage, the logic circuit 34 writes a first intermediate value to a first group of locations in the memory 32. In a second stage, the logic circuit 34 writes a second intermediate value to a second group of intermediate locations in the memory 32. In a third stage, the logic circuit 34 writes a final value to both the first and second groups of locations of the memory 32. The first intermediate value is preferably selected such that, if erasing of the memory 32 is terminated after or during the first stage, the counted number of data blocks with the inherent property in the memory 32 will indicate the presence of confidential data. In other words, the intermediate values are selected to be non-confidential data that have the inherent property. Each half of the confidential information is selected to have the inherent property to ensure that the presence of either half is sufficient to classify the information as confidential under the diffused checksum process. This selection is made because, when performing a bulk erase, some memories enter an undefined state which might falsely classify the device as not containing confidential information. The inherent property of each half should be significantly over the threshold to protect against false classifications in the event of some degradation of the non-volatile storage. In the preferred embodiment, at least 96 bits in each half must be set. This is not an unreasonable restriction in that randomly generated key material should be unbiased and should, thus, easily meet this number. In the illustrated apparatus 10, the first and second intermediate values are identical. They are set to the hexadecimal value 0x55. Also in the illustrated apparatus 10, the first stage is performed by writing the hexadecimal value 0x55 to all even addresses in the memory 32; the second stage is preformed by writing the hexadecimal value 0x55 to all odd addresses in the memory 32; and the final stage is performed by writing the hexadecimal value 0x00 to all addresses in the memory 32. Persons of ordinary skill in the art will, however, appreciate that other values can be selected for the first intermediate value, the second intermediate value and/ or the final value, and/or that more or less erasure stages can be employed without departing from the scope or spirit of the invention.

It is well known that hackers sometimes attempt to read the contents of a memory via various physical attacks. To prevent these techniques from being employed to frustrate the security measures used to maintain the contents of the memory 32 in confidence, various security measures can be employed (e.g., a protective layer can be physically secured to the memory 32).

As will be appreciated by persons of ordinary skill in the art, the diffused checksum procedures discussed above can be utilized to define the security state of the memory 32 or a system containing the memory. If the diffused checksum process indicates the presence of confidential data, the memory 32 is defined as being in a first security state. If no confidential data is present, the memory 32 is defined as being in a second security state. In the illustrated apparatus 10, 30, testing of the memory 32 is only enabled when the memory 32 is in its second security state.

As discussed above, the illustrated apparatus 10 enforces at least two security cells, namely, a kernel mode cell and a user mode cell. The processor 16 preferably operates non-secure software in the user mode and secure software in the kernel mode. For many applications, two security cells is sufficient. However, in some instances, it is desirable to have more than two security cells. For example, it might be desirable to permit multi-tasking between multiple secure tasks, it might be desirable to provide protection between two or more cells running software simultaneously (e.g., different conditional access systems from different vendors), and it may be desirable to prevent compromises of one cell from compromising all of the system.

As shown in FIG. 2, the illustrated apparatus 10 may optionally be provided with a memory management unit 38 to facilitate the enforcement of multiple security cells through separate address spaces and demand paging between the secure internal memory 18 and the external memory SDRAM 24. In the illustrated embodiment, the memory management unit 38 is implemented as a co-processor that assists the processor 16 in apportioning memory resources between the multiple security cells as needed. In this application, each page is a separate, independently encrypted and authenticated block. In addition, it will be appreciated that some or all of the security cells can be running in a user mode such that they have limited access to internal secure peripherals but still have a protected, secure environment. Persons of ordinary skill in the art will appreciate that many devices can be implemented in the memory management role without departing from the scope or spirit of the invention. Specifically, this function can be easily accommodated by a standard memory management unit.

As shown in FIG. 3, the processor 16 is implemented by the R3000A MIPS RISC CPU (million instructions per second Reduced Instruction Set Computer Central Processing Unit) which forms the core of the R3904 chip sold by Toshiba. As also shown in FIG. 3, the non-volatile memory 14 is preferably implemented by a ROM; the non-volatile memory 32 is preferably implemented by an EEPROM; the read/write memory 18 is preferably implemented by a volatile data memory (DMEM); and the cipherer 20 and the authenticator 22 are implemented by the same dedicated hardware circuit to leverage the performance advantage of the hardware cipherer and because most block ciphers can be adapted to a secure hash. However, the cipherer 20 and/or the authenticator 22 could be implemented by software without departing from the scope of the invention. Combining the cipherer 20 and the authenticator 22 may not be an acceptable tradeoff where the security requirements of the device require a larger hash than the block size of the cipher. The processor 16 communicates with the ROM 14, the logic circuit 34 and the DMEM 18 via a 32 bit general bus 40 (GBUS) which, in some applications, also acts as the import/export means for importing and exporting encrypted information sections between the DMEM 18 and the SDRAM 24 as explained above.

For the purpose of controlling the movement of information blocks between the DMEM 18 and the cipherer 20 and for sharing the cipherer 20 with the satellite transport function in the application of FIG. 1, the apparatus 10 is further provided with a second processor 42. As shown in FIG. 3, the second processor 42 is in communication with the cipherer 20 (implemented in the illustrated apparatus 10 by crypto module 20), and with the read/write memory 18 (in the illustrated embodiment, the DMEM) via a bus 44. The second processor 42 is adapted to initiate decryption and re-encryption of information blocks stored in the DMEM 18. In the illustrated embodiment, the second processor 42 is implemented by a sequencer. The presence of the sequencer 42 and its connection to the cipherer 20 in the disclosed embodiment is dictated by the end application (FIG. 1) and is not necessary to a successful implementation of the invention.

In the illustrated apparatus 10, the sequencer 42 acts as a peer to the processor 16. To facilitate instruction delivery from the processor 16 to the sequencer 42, the apparatus 10 is provided with an instruction memory (IMEM) 46. In operation, when the processor 16 needs to request the sequencer 42 to perform a task, it writes the necessary instruction(s) to the IMEM 46 and sends a control signal to the sequencer 42 indicating the presence of the instruction(s) in the IMEM 46. The sequencer 42 then reads and executes the instruction(s) from the IMEM 46.

As mentioned above, the apparatus 10 is provided with an authenticator 22 which serves to authenticate decrypted information prior to execution by the processor 16 and to re-authenticate the information prior to encryption by the cipherer 20. In the illustrated apparatus 10, the authenticator 22 is implemented by the cipherer 20.

As also mentioned above, the cipherer 20 is preferably adapted to perform key cycling with respect to the whitening keys used to ensure re-encrypted information blocks always appear differently than they did prior to decryption. In order to generate the new whitening keys inherent in the key cycling procedure, the apparatus 10 is provided with an entropy source 48 which is used to continuously re-seed a cryptographically strong pseudo-random number generator (CSPRNG). To leverage the performance advantage of the existing hardware cipherer 20, the cipherer 20 implements the CSPRNG. As shown in FIG. 3, the entropy source 48 is in communication with the sequencer 42 and the crypto module 20 via the bus 44. The sequencer 42 is adapted to request the entropy source 48 to generate a new random number when required and to deliver the random number to the crypto module 20 for use by the CSPRNG in generating the whitening key to be used in the re-encryption process.

As also mentioned above, some of the keys used in the triple key, triple DES algorithm are stored in the memory 32.

In order to ensure that these keys are only available in the cipherer 20 and the memory 32, and that the keys are not accessible by the processor 16, the sequencer 42 or any of the software/firmware they execute, the apparatus 10 is provided with a key isolation circuit 50 connecting the logic circuit 34 to the cipherer 20 for loading the root key of the key hierarchy. More specifically, in the illustrated apparatus 10, the key isolation circuit 50 provides a mechanism for delivering the necessary key material from the EEPROM 32 to the crypto module 20. To ensure the keys cannot be accessed by other system components (hardware, software or firmware), the memory 32, the logic circuit 34, the key isolation circuit 50 and the crypto module 20 define a closed system.

As also discussed above, the states of the external pins are forced to a predefined state during access to secure internal peripherals to prevent sensitive information from being exposed outside the secure environment. To this end, the apparatus 10 is provided with one or more silent mode silencing circuit(s) 52. The silent mode silencing circuit(s) 52 are preferably implemented as hardware circuits including logic gates which pull the external pins to the predefined state (such as a tri-state) except after detection that the bus cycle will not be accessing confidential data. This detection can be done based on the address appearing on the bus. In this way, both accesses to internal confidential data as well as bus inactivity is masked. As a result, an attacker is denied information for statistical attacks based on such details as the flow of execution, instruction execution time, or the order of data access.

VersaCrypt Software Discussion

For security reasons, it is necessary for the Secure Kernel to put various restrictions on which Realtime Operating Systems (RTOS) can be used with the apparatus 10. The following list contains the requirements/restrictions the RTOS must meet:

1. Context Switching—The Secure Kernel (running on the RISC 54 (16)) performs the actual context switching (i.e., switching between tasks), but will only do so when explicitly requested to so act. Both preemptive and nonpreemptive context switching is supported.
2. VersaCrypt Context Switch Assist—The RTOS is expected to set a flag to indicate when a VersaCrypt applet has run long enough to consider allowing another VersaCrypt applet to run. The final decision is made by the Secure Kernel based on whether another VersaCrypt applet is runable, and if such an operation is currently disabled.
3. System Startup—The Secure Kernel is integrally involved with the process of system startup. If the RTOS has any requirements about initial state, where it is loaded from, or how it is loaded, it can be accommodated by the VersaCrypt bootstrap applet that is a part of the Secure Kernel startup.
4. Kernel Mode—The Secure Kernel and VersaCrypt (i.e., the encrypted software being executed within the secure environment provided by the apparatus 10) have sole use of the Kernel mode of the processor. This implies a) Interrupt Handling—all interrupts will be handled by the Secure Kernel, and then passed of to a table of User supplied handlers. b) System Calls—the API to the Secure Kernel is via the Syscall instruction. The RTOS may not implement any system calls via the Syscall instruction. c) Error Handling—events such as Bus errors, etc., are not passed on to the RTOS. d) Address Map—all nonsecure peripherals are mapped into the user address space, so that the Secure Kernel does not become a bottleneck in accessing them.
5. Low Memory Globals—There are a small amount (less than 256 bytes) of global variables used to communicate between the user software and the Secure Kernel. If the RTOS has any low memory globals, they should be made to not conflict with these.
6. Source code for the RTOS—The RTOS must be modified to run over the Secure Kernel.

Figure 4:
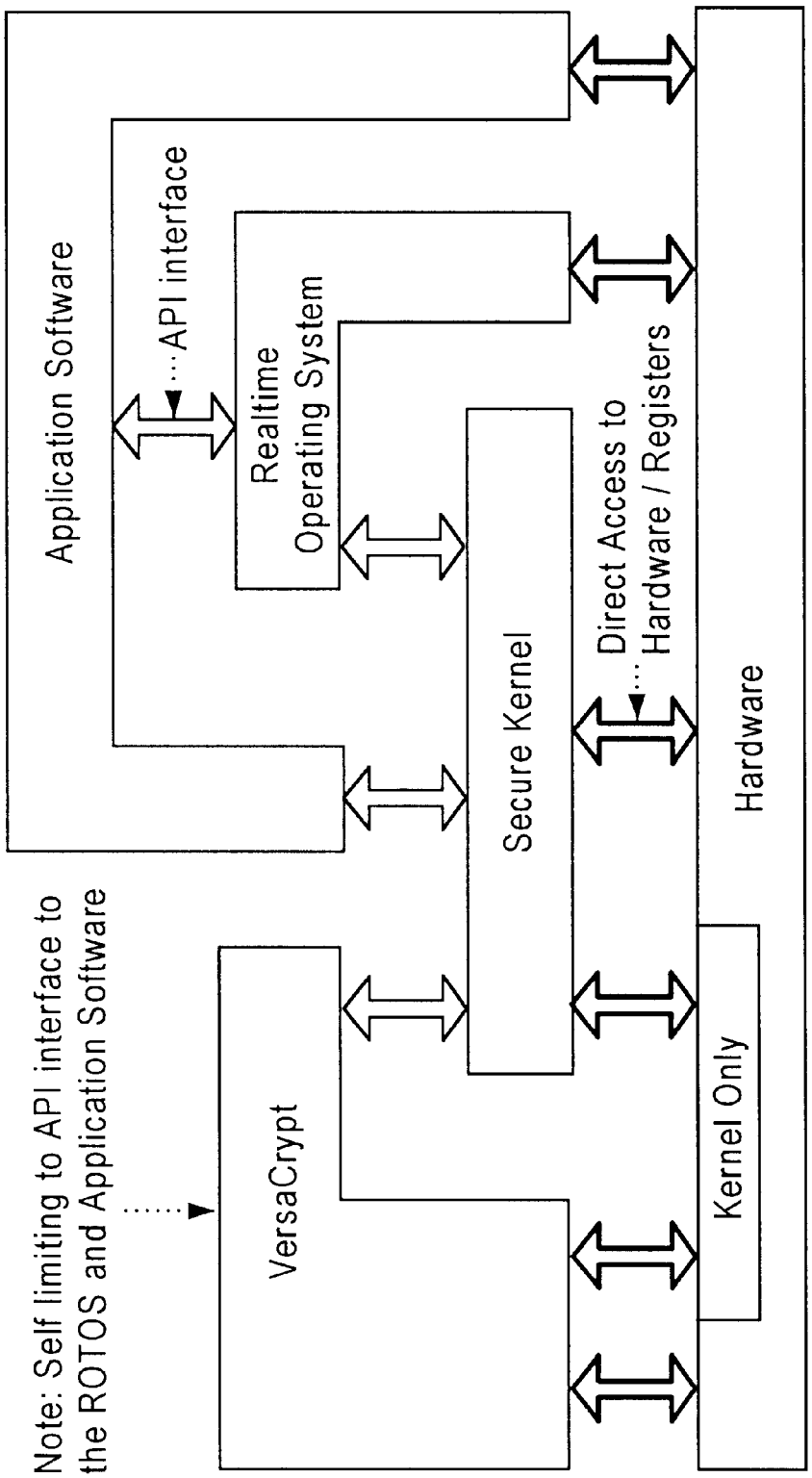
FIG. 4 is a schematic illustration of the software architecture employed in the apparatus.

FIG. 4 illustrates the relationship between the various classes of software that will be running on the MIPS processor 54 (16). The difference between this model, and a more traditional model is that certain functions require going through the Secure Kernel. These functions are: 1. access to hardware that is controlled for security reasons; 2. any functions that must be assumed for security reasons, such as dispatching interrupt handlers; and 3. communications with the VersaCrypt environment, so as to have a well defined secure interface. Although VersaCrypt applets are able to directly access the Realtime Operating System and application software, both via variable access and subroutine calls, they will restrict themselves to communicating through the Secure Kernel API.

Most system calls are executed with interrupts disabled, but some that are expected to have a longer execution time will execute with interrupts enabled as a part of the callers task, but with preemption disabled. This is a security requirement, as there are a limited number of Kernel contexts available in internal memory 18. This ability to disable preemption is only exercised for a limited time by the Secure Kernel. It could also be used by a VersaCrypt applet, if needed, but its use is discouraged due to its impact on realtime performance.

There is also a small amount of cycles that are stolen when returning from interrupts or performing context switches that support the VersaCrypt export/import operation. This code is executed with interrupts enabled (same interrupt mask as before the interrupt was dispatched) so as to minimize the impact on interrupt latency. The amount of time taken is small enough that it would not be worth the overhead of performing a context switch to the Kernel Task, and so does not greatly effect system performance, but will make a large difference in performance of the VersaCrypt export/import operations.

All of the Kernel mode software executes from one Realtime Operating System task. It is shared by the Secure Kernel, all the VersaCrypt applets, and any user functions called for Kernel mode software. The reason that they all share a common task is that only one VersaCrypt applet (at most) is actually imported and runable at a time. To be able to support them as multiple tasks, the Realtime Operating System would require multiple VersaCrypt applets marked as runable, but they would immediately block when a context switch to an exported VersaCrypt applet was performed until an Export/Import operation could be performed. This would cause VersaCrypt thrashing, unless the Realtime Operating System scheduler were extensively modified. The portion of the Secure Kernel that executes in this task are either the export/import software (whose execution is always mutually exclusive with the execution of VersaCrypt) or in response to system calls that execute as part of the callers task. The user function is always running as requested by VersaCrypt or the Secure Kernel, and so is logically part of the task's execution. Since a user function is a synchronous call, the caller must wait for its completion. Other means should be taken if its execution time is expected to be large enough to consider an export/import operation, such as sending a message that another task could block on. The secure kernel implements support for a synchronous call between kernel software and a user function. The importance of this is to provide a secure transfer between the two modes and to protect the state of the kernel.

When the Secure Kernel is not runable, it will keep calling an RTOS routine to sleep for one tick. This includes the time when there are no VersaCrypt applets to execute, as well as the time when it is performing a VersaCrypt export/import operation. This can cause an initial delay of up to one tick until starting to execute a VersaCrypt request or until the start of the VersaCrypt export/import operation to load the requested applet.

The sequencer code (executed from IMEM 46) is split up into kernel and user segments. The kernel segment is further broken down into a permanently loaded section that provides system functions and a second section where other kernel sequencer applets are overlaid on an as needed basis.

The use of VersaCrypt is intended to meet soft realtime demands. It cannot meet hard realtime demands due to the long time (multiple ms) taken to perform an export/import operation. Although it cannot guarantee a small latency due to this context switch time, in the disclosed embodiment it is capable of supporting 10's of requests per second while using a small percent of system resources for the Export/Import operation. If most of the requests only involve a single VersaCrypt applet, then the export/import operation is avoided and 1000's (or more) of request per second can be processed. It is also worth noting, that some of these requests can take extended amounts of time to process, such as an RSA key operation that might take multiple seconds to complete, depending on the key length.

The applications interface to VersaCrypt is through a simple API that allows multiple request to be queued up for the same or multiple VersaCrypt applets, with separate queues for each VersaCrypt applet. These requests are handled a synchronously to the caller, and a user supplied callback function is executed on completion to handle the results, or this callback could post some event that the caller's task could block on.

If the cipherer 20 is to support multiple key sizes, i.e., single DES operations, then interlocks must exist to protect against incremental attacks on triple DES keys. Even if a key hierarchy is used, it is important to authenticate any encrypted keys before they are trusted.

It is generally accepted that it is more secure for a device to generate its own keys, rather than to have them injected from outside. If the device has the capability to adequately generate its key material, it is more secure than to have it known for a limited time external to the device. What is never known cannot be divulged. What was never outside, cannot be intercepted. The apparatus 10 is capable of executing software in an externally unobservable fashion and has a hardware random number generator (RNG 48). Self key generation is an example of the class of operations it was designed to perform. This capability is of great importance in keying a secure device where the physical security of the factory cannot be maintained.

In one possible approach to self-keying, the apparatus 10 requires three secrets to generate its own key material. The first secret is the shipment keys (the software export/import EMK, triple key, triple DES) that are programmed in at the ASIC factory. The second secret is an ESK (triple key, triple DES) with its associated VersaCrypt applets, all of which are provided at a second factory. The third secret is, for example, an RSA private key (large) for the key server.

Figure 5:
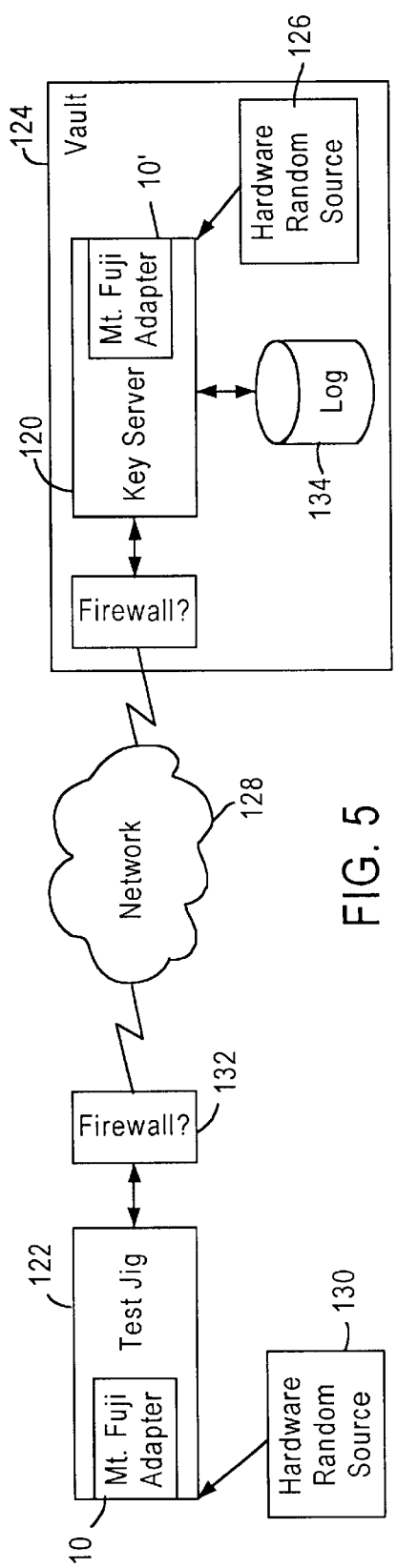
FIG. 5 is a schematic illustration of an exemplary system for programming the apparatus.

The key server is preferably located at a third physically secured site referred to as a vault. To generate keys in an apparatus 10, the following hardware is required: 1. a key server 120 and 2. a "test jig" 122 (see FIG. 5). The key server 120 in the vault 124. The key server 122 is implemented as a personal computer (PC) with a network connection and with an apparatus 10' running special software. The satellite I/F 94 is optionally connected to a hardware random source 126 so as to have access to even more entropy during key generation. The key material for this adapter 10' must be unique, so that if any other adapters are compromised in the field, it would in no way compromise the security of the key server 120. The key server 120 is preferably isolated from the network 128 by a firewall 132.

The test jig 122 is located at the second factory. In the disclosed embodiment, the test jig 122 is implemented by a PC that is connected to each apparatus 10 as it is programmed. The test jig 122 is connected to the key server 120 through some network interface 128. The satellite I/F 94 of the apparatus 10 is also optionally connected to a hardware random source 130 for the same reason. It may also be optionally isolated from the network 128 by a firewall 132.

Figure 6:
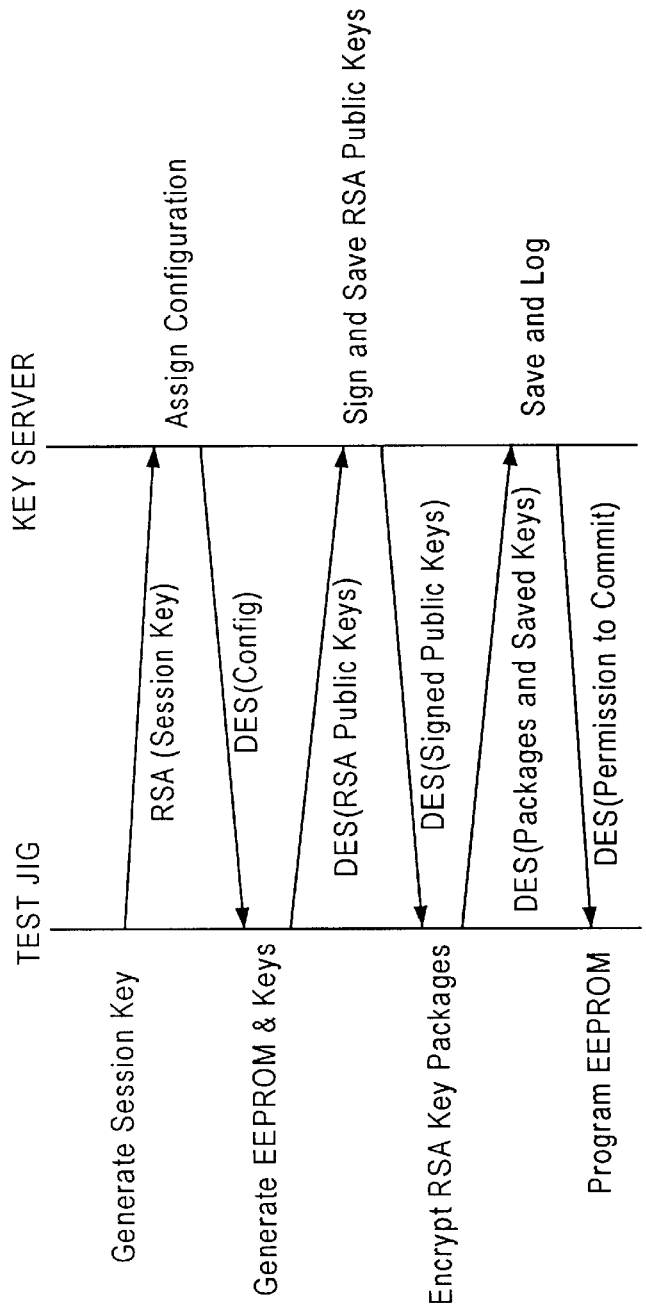
FIG. 6 is a ladder diagram illustrating the programming of the EEPROM of the apparatus.

The programming of an apparatus 10 loaded in the test jig 122 will now be described. The steps of this programming procedure are illustrated in FIG. 6. In FIG. 6, actions occurring at the adaptor 10 being programmed are shown on the left; actions occurring at the key server 120 are shown on the right; and communications between the key server 120 and the test jig 122 are represented by the arrows in the middle of the diagram.

The apparatus 10 securely boots from an external ROM, as described in the startup operation below. All of the following operations are from VersaCrypt applets. All communications are between the VersaCrypt applets at the key server 120, and the VersaCrypt applets in the apparatus 10 being programmed in the test jig 122. Preferably, all the data stored to disk on the key server 120 is encrypted to protect against compromises/viruses on the key server 120.

The first applet contains the "public key" of the key server 120, although it is not really publicly known. The hardware random source 130 is used to update the random seed material. To maximize the effect of external random bits, updating the seed material is performed an application specific number of times. The apparatus 10 being programmed then produces a triple key, triple DES session key. This key is encrypted with the public key of the key server 120 and is sent to the key server 120 using the network interface of the test jig 122.

The key server 120 validates that it is talking to an apparatus 10 by checking the source IP Address. It also knows it is talking to an apparatus 10 because the source used the public key. The key server 120 confirms that it has never (or in the last application specific number of times) seen this session key before, to protect against replayed data attacks or a tainted random source 130. After decrypting the session key with its private key, all future communications between the apparatus 10 being programmed and the key server 120 are encrypted (O-CBC) with this session key and contain an SHA hash to validate it. They also include the unique serial number assigned to this apparatus 10 and a packet type, to protect against replayed data attacks.

The key server 122 then sends the apparatus 10 some random numbers from the key server's source 126 (which is assumed to be more secure), to update the seed material in the apparatus 10. It will also send any assigned configuration, such as a serial number, and a software export/import MK.

The apparatus 10 knows it is talking to the key server 120 since the responding entity must have known the private key to get the session key. The apparatus 10 updates its random seed material based on the random numbers received from the key server 120 and generates its new 512 byte EEPROM image (content described below). The apparatus 10 also generates any other confidential data that might be needed for an application. The apparatus 10 then sends the RSA public keys to the key server 120, who signs them in a database 134, saves them, and returns the signed keys.

The apparatus 10 then sends the key server 120 any confidential information that it may need to share for operational or legal reasons. The key server 120 then logs the received escrow material, and tells the apparatus 10 to commit its configuration. Finally, the apparatus 10 responds by reprogramming its internal EEPROM 32 and by informing the test jig 122 it has succeeded, so the test jig 122 can proceed with the next apparatus 10.

Persons of ordinary skill in the art will appreciate from the foregoing that, to be able to break the security of the key generation by gaining access to the public key, collusion is required between someone at the chip factory and someone at the second factory. Even with access to these three secrets, the system remains immune to any passive attacks.

The EEPROM 32 preferably includes the following data blocks. Applications requiring additional EEPROM may optionally use an external unsecure EEPROM, an external encrypted EEPROM with a device specific key (and internally authenticated), and/or a larger internal EEPROM 32.

| Bits | Usage |
| --- | --- |
| 1024 | Scrambled device key. This is the root of the key hierarchy. It is not directly accessible to software. |
| 32 | Checksum or MAC on the restricted block of EEPROM 32, except the scrambled device key (because software cannot read it). |
| 192 | Software export/import EMK (encrypted master key, the second key in the key hierarchy). |
| 192 | Key for CSPRNG random number generator. |
| 32x2 | Seed for hardware random number generator. |
| [The following sections constitute the field programmable Kernel area.] | |
| 64 | Seed for CSPRNG random number generator. |
| [User Space begins here. This will be copied into external SDRAM.] | |
| 32 | Hardware configuration. |
| 32 | Serial number of this unit. |
| 32 | Software export/import EMK index. Employed to indicate which EMK was used so the right ESK can be provided when loading software. |

Implementation Details Concerning The Secure Kernel

The main purpose of the Secure Kernel is to provide the VersaCrypt environment, but to do this it must become involved in the following operations: startup, interrupt processing, context switching, system calls, exception handling, alarm condition handling, and VersaCrypt management.

Startup Sequence

Figure 7B:
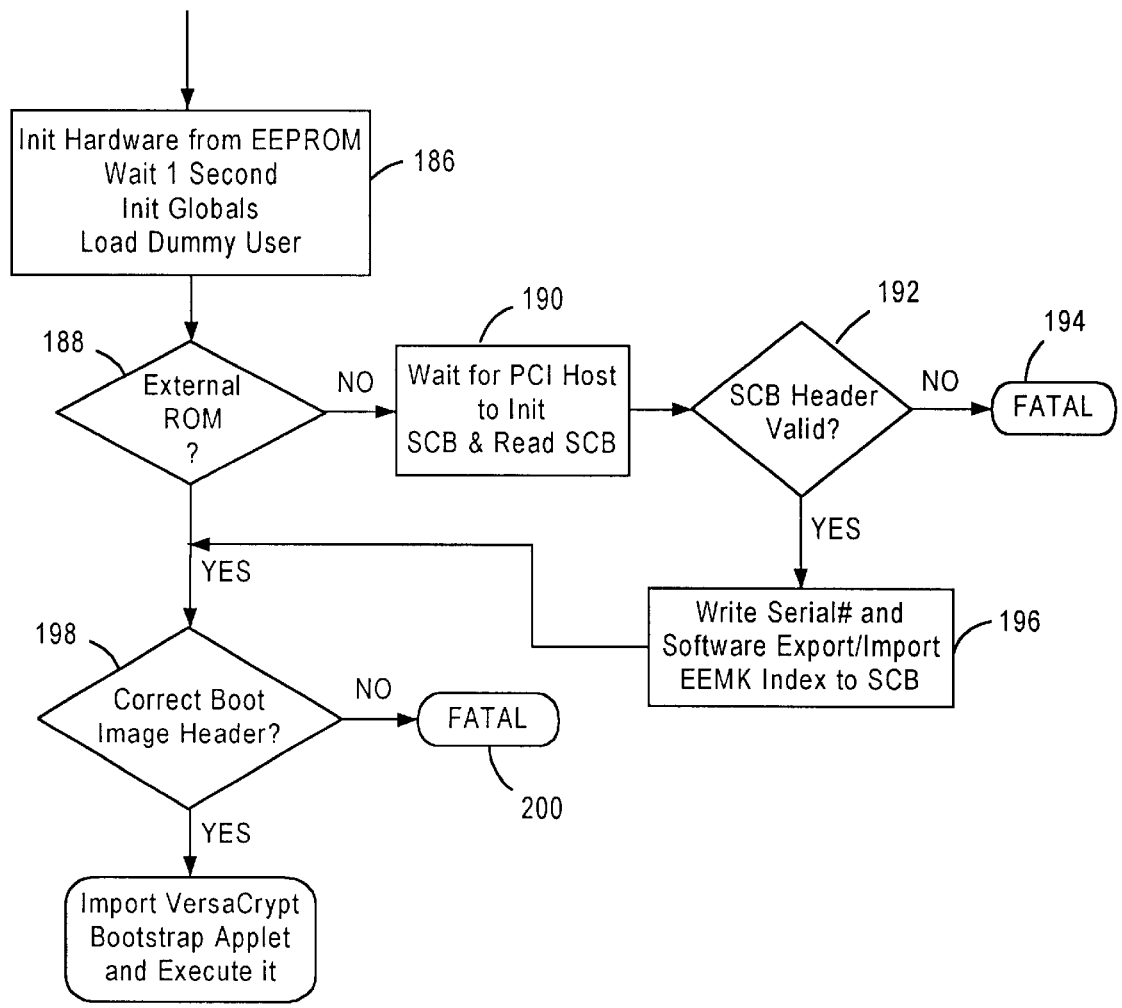
FIG. 7 is a flow chart illustrating the startup operation of the apparatus.

Upon startup, the Secure Kernel executes the following sequence of operations. The sequence is shown in block diagram format in FIG. 7.

A. Examiner Reset/NMI Cause Register

The Reset/NMI cause register is a hardware register used to detect the cause of all reset/NMI conditions which may be due to alarms. If it contains an alarm condition (block 144), then on reset or NMI, software disables some internal peripherals. The reason for this operation is to stop operations that might either cause additional alarms to occur, or interfere with error processing. If debugging is enabled (block 148), execution will transfer to a routine external to the internal ROM to make available information about the cause. System operation, however, will not be able to continue (block 150). Otherwise, if this is a stand alone product (i.e., a set top box with no external processor) (block 152), as indicated in a location in the EEPROM 32, the device 10 performs a self reset operation (block 154). This is so that, in the case of recoverable errors, the unit 10 will continue to operate without user intervention. Of course, in the case of nonrecoverable errors, the unit 10 will keep rebooting indefinitely, and no cause will be easily discernible. The cause should be written to a well known location, before self reset, so it can be diagnosed with a logic analyzer if need be. If the subject apparatus 10 is not a stand alone unit (block 152) (i.e., a second external processor), all operations will stop, memory will not be cleared, the cause code will be made available (through the PCI 80, an externally visible bus operation, and the LED 140), and the chip 10 will wait for an external reset (block 156).

B. Boot Diagnostics and Initialize Hardware

Minimal important or secure hardware will be initialized. If no alarm condition is present (block 144), some hardware initialized, all processor registers and internal memories (IMEM 46 and DMEM 18) and some global variables are cleared (block 164) so data from a previous application will not be exposed, especially if the bulk erase function is exercised.

C. EEPROM Operations

If a bulk erase is triggered, then the three step bulk erase operation previously described is employed.

The 3K section of EEPROM 32 is read and a 1's density is calculated. If the 1's density is below the threshold of 64 (block 170), it is assumed that no key material is present and testing or initial programming can occur. In such a circumstance, some security circuitry is disabled (block 172). If a fixed pattern (used to detect the presence of an external ROM 142 is present (block 174), the external ROM 142 will be jumped into (block 176). If no external ROM 142 is present (block 174), the apparatus 10 will lockup, but will at least allow external test pins (block 178).

If the diffused checksum process indicates the presence of confidential data in the memory 32 (block 170), a checksum on the restricted block of the EEPROM 32 is calculated (block 182). If the checksum is bad, a fatal error occurs (block 184). The apparatus 10 is locked up because either the EEPROM 22 has degraded or the unit 10 has been tampered with. If the checksum is o.k. (block 182), various hardware configurations are set based on values retrieved from the EEPROM 32 (block 186).

D. Delay

Some relatively small (nominally 1 second) delay then occurs (block 186). This delay serves multiple purposes. Most importantly, it causes an attacker to take longer per iteration (for many types of automated attack) without being noticeable to users during a longer system reboot time.

E. Initialize Secure or Important Hardware

Some global variables are now initialized (block 186). In preparation for loading the VersaCrypt bootstrap, the Secure Kernel's permanently loaded sequencer applet, and it's dummy User sequencer applet are loaded into IMEM 46 and the sequencer 42 is started (block 186). Also, some dummy user RISC code is loaded. The dummy applet and RISC code are loaded so that the loading of the VersaCrypt bootstrap applet will use the same code as is used under normal operation, rather than maintaining a second version used only for system startup. The normal Kernel, sequencer, and RISC code for importing a VersaCrypt applet assumes that the user code is present and interacts with it. The Kernel sequencer applets expect to be called by the user background, and must have a foreground handler (part of the satellite transport function of the chip) for it to yield to. The Kernel RISC code will keep attempting to yield control to the RTOS while waiting for the sequencer 42 to complete. Some user nub must be present to handle these functions.

F. Loading of VersaCrypt Bootstrap Applet

An attempt will be made to load a VersaCrypt bootstrap applet from either an external ROM 142 or the PCI bus 78. All VersaCrypt bootstrap applets, even from a 32 bit external ROM 142, will be copied into DMEM 18 before execution. An external ROM 142 can be used for booting on systems without a PCI Bus 78, for testing, for diagnostics on returned units, for debugging, etc. Its presence can be detected by the first half of a well known pattern at a fixed offset (block 188). If no external ROM 142 is present (block 188), then the apparatus 10 attempts to boot over the PCI bus 78 (block 190). Specifically, it first waits for the SCB to be set (become non 0) from the PCI host (block 190). It then reads the block specified in the SCB into SDRAM. If the first half of the pattern does not match (block 192), then a fatal error occurs (block 194) and control will return to block 146. If a match occurs (block 192) it will then write back into the SCB after offset 8 the serial number and software export/import EMK index for the apparatus 10 from the EEPROM 32 (block 196). If the second half of the pattern does not match (block 198), then a fatal error occurs (block 200).

Unlike other VersaCrypt applets, the bootstrap applet executes with interrupts disabled. This is because it is part of system startup, and may need to explicitly reset some external devices before they stop posting an interrupt, which is beyond the scope of the Secure Kernel. It is assumed that this VersaCrypt applet will handle bootstrap loading of the real boot image. This is to simplify the Secure Kernel and to allow boot image format to adapt to specific applications, and possibly change if new requirements are found. Part of this operation includes initializing certain well defined locations in memory dealing with secure functions such as VersaCrypt applets.

Typical operation of the VersaCrypt bootstrap applet is as follows (1) initialize the VersaCrypt environment and load VersaCrypt applets and authentication information; (2) load and tamper check user software; (3) initialize the CSPRNG; (4) initialize various secure and user variables that are used to control the configuration of the secure kernel for the system use; and (5) control then passes to the code in user mode, with interrupts disabled. All registers are cleared. Interrupts are disabled because as part of system startup, it may be necessary to explicitly test some external devices before they stop posting an Interrupt, which is beyond the scope of the Secure Kernel. The registers are cleared to protect possibly sensitive material that may be left in them during system startup. User software will have to initialize certain well defined locations in memory dealing with insecure functions such as interrupt handlers and stacks.

Interrupts Processing (and Context Switching)

Figure 8B:
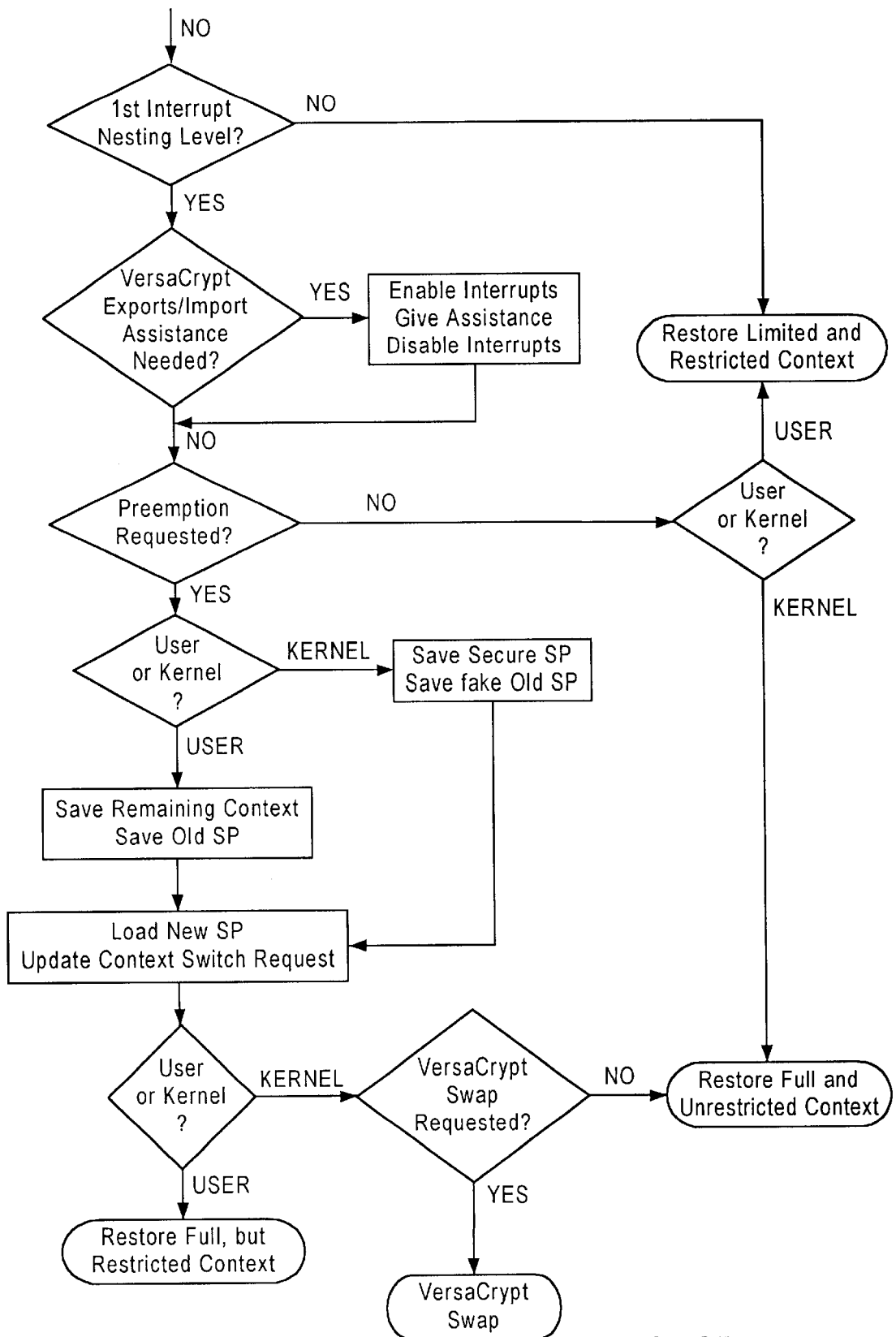
FIG. 8 is a flow chart illustrating the interrupt handling process employed by the apparatus.

The process of dispatching an interrupt handler and returning from interrupts is shown in FIG. 8.

A. Interrupt Processing

All interrupt handlers are executed in user mode, through a user provided table of handlers. Returning from an interrupt is via a system call. Although there is a separate interrupt stack (as required for VersaCrypt, and also so each task need not allocate enough stack space for nested interrupts), when each task is defined it needs to have allocated additional bytes of stack space used for context switching.

The context is saved on the stack for a variety of reasons. It simplifies preemptive context switches, as might be triggered from a timer interrupt routine which must have already saved a partial context on the stack. The Secure Kernel would be the logical place for this to happen, because the user routine would have to work around the registers saved by the interrupt handling part of the Secure Kernel. The Secure Kernel also would have to have this functionality for VersaCrypt, and in fact would execute faster since the internal ROM 14 is faster than the external SDRAM 24 that user code would execute from. Placing the context on the stack is most convenient, since all tasks must have their own stacks, as will VersaCrypt. Also, in this way, the Secure Kernel doesn't require any knowledge of the underlying RTOS's task control blocks or other data structures. Only the saved stack pointer would need to be saved in the task control block. Changing context for the Secure Kernel would only entail saving the remaining registers (for User Code) onto the stack, switching stack pointers, and restoring the full context (as is always done for VersaCrypt).

B. Interrupt Stacks

For system security, when interrupts are enabled (or when system calls are made), user mode code must have a user space stack, and Kernel mode code must have a Kernel space stack. In addition, Kernel mode code cannot be run with interrupts enabled from an interrupt handler. These requirements are present because, under these circumstances, we may need to save the current context onto the stack. If the user had a Kernel stack, he could use it to access Kernel space resources when his context is saved. If the Kernel had a user stack, his security could be compromised from an interrupt routine who could read and modify his saved context. And finally, the limit on Kernel mode from an interrupt routine is to limit the number of Kernel contexts that must be stored in DMEM 18 concurrently.

The Secure Kernel has a number of contexts that it must maintain. Each VersaCrypt applet has a context on its own stack, whether in DMEM 18 (only for the currently loaded VersaCrypt applet) or encrypted in external SDRAM 24. The Secure Kernel must also have a second context that is used while performing export/import operations. It also has a third context for handling system calls that are nonpreemptable, but are run with interrupts enabled because of the time they take to execute, in order to minimize system interrupt latency. These system calls must be nonpreemptable because otherwise they would require multiple contexts in DMEM 18, one for each task that might be making a system call at the same time. This third context is also used when stealing cycles to assist VersaCrypt Export/Import operations when returning from interrupts or performing context switches.

When Kernel mode code (VersaCrypt applets or the Secure Kernel) are running, the system saves and clears all registers (this protects and hides sensitive data), before passing control to the interrupt routine. This causes an interrupt latency of 4–5 $\mu S$ (not including any time when interrupts are disabled, such as most system calls, or bus usage by the dma). Since realtime software must be able to survive this long of an interrupt latency, and to simplify the writing of interrupt handlers, the kernel will save a partial context on the stack when user code is interrupted. This will still be faster than Kernel mode, but should be more than sufficient for interrupt processing.

C. Context Switching

Wen returning from an interrupt, the Secure Kernel checks some global variables used to indicate that a preemptive context switch is needed. This includes the address of where the current stack pointer should be saved (presumably an offset into the current task's task control bock) and the address of where the new stack pointer can be loaded from to restore the context (presumably from the next task's task control block). When this preemption occurs, it saves the remaining context onto the stack (for user tasks) and restores the full context from the stack (like it always does for the Kernel).

D. VersaCrypt Support

Before returning from an interrupt and when performing a context switch, the Secure Kernel may perform some limited operations (uses limited time) associated with VersaCrypt export/import operations, such as copying a block of memory and scheduling Kernel sequencer applets. This can defer preemptive context switching by a small delay, but should not seriously impact system performance. It does not effect interrupt latency, as these operations are executed with interrupts enabled.

There is a single Kernel task that will either be executing user routines for the Kernel or shared between all VersaCrypt applets and the Secure Kernel. The saved stack pointer is a false value (all 1s), rather than exposing the real value or allowing user software to change it. The real stack pointers are saved in DMEM 18, or encrypted in external SDRAM 24 for exported VersaCrypt applets. This single task gives VersaCrypt applets a low priority, but that would be the case anyway due to the large delay associated with exporting the old applet with its data, and importing the new applet with its data. There is only a single task for all Kernel tasks, because only one VersaCrypt applet could be runable at a time, since the others are encrypted in external memory 24, and also because the Secure Kernel only needs to execute on behalf of some other task.

For speed of execution, if the applet to run is currently loaded, it will not be exported and re-imported, but run as is. If the currently running applet has data segments loaded that are needed by the applet that will be loaded, the data segments will be exported and re-imported, to simplify the Secure Kernel.

To support preemptive VersaCrypt scheduling, the RTOS must set a global flag to request VersaCrypt Swaps. This can be easily accomplished from the RTOS timer interrupt routine.

The algorithm that is used to perform VersaCrypt scheduling is to check VCswap every time it performs a context switch to the Kernel task in Kernel mode. If (1) a VersaCrypt swap is requested, (2) there is another VersaCrypt applet waiting in the VersaCrypt run queue, and (3) VersaCrypt swapping is enabled, then an Export/Import operation will be started instead of executing the pending VersaCrypt applet. Most of the operations involved in an export/import operation have to do with loading Kernel sequencer applets and scheduling them to execute. The sequencer is responsible for the actual encryption and authentication. Since these operations can be completed in a small amount of time, cycles are stolen to perform these operations when returning from interrupts and performing context switches. The remaining operations take a longer time to complete and so are executed from the Kernel task. These operations are copying blocks between DMEM 18 and SDRAM 24, and flushing the caches. Because of this approach, there is an additional three round-robin scheduling delays associated with VersaCrypt swaps. The usage of these three scheduling delays are: 1) copy from DMEM 18 to SDRAM 14 after performing the export, and start the import; 2) check import of applet, flush instruction cache, and start import of data segments; and 3) check import of data segments, flush data cache, and start applet execution.

E. VersaCrypt Export/Import

The purposes of VersaCrypt control blocks are to store VersaCrypt applets and data segments in external memory; to manage the user VersaCrypt calls; and to maintain the VersaCrypt run queue. To be able to take advantage of common routines in the Secure Kernel, applets are treated as special cases of data segments.

The format of the VersaCrypt control blocks in external memory 24 is:

| Bits | Field | Description |
|---|---|---|
| 32 | Link | This is used to place the VersaCrypt applet in the queue of VersaCrypt applets that are currently awaiting execution. |
| 32 | Unused | 0 |
| 64 | Queue | Head and tail of queue of requests for a given VersaCrypt applet. |
| [Tamper Checking begins here] | | |
| 16 | ID | Unique non-zero ID for each block. |
| 16 | Size | Size (in 64 bit DES blocks, non-zero) of the encrypted section |
| 16 | Unused | 0 |
| 16 | Flags | These flags are used by the system for distinguishing applet vs. sub applet vs. data segment, and the run state for applets. |
| [Ecryption begins here, triple key, triple DES O-CBC] | | |
| 64 | PreWhite | This is a random value that is XORed with all plaintext before encryption. This value changes with each export. |
| 64 | PostWhite | This is a random value that is XORed with all ciphertext after encryption. This value changes with each export. |
| 64n | Data | This is either the VersaCrypt applet (described below), or the data segment. |
| 64 | Checksum | This is some encrypted checksum on the tamper checked region through the data. [Not necessarily stored here, as described below.] The apparatus 10 uses a single DES CBC-MAC. The PreWhite field is the DES key for this operation, since choice of key should not be a security concern. The IV will be the PreWhite field, only with its words swapped. |

The apparatus 10 uses whitening to strengthen the key material, since the export process provides an attacker with a large amount of ciphertext. It also means that each time a block is exported, all the data is changed, denying hackers information about what data is changing or how long certain operations take. It also protects against known plaintext attacks since the beginning of all VersaCrypt applets will be fairly constant. And finally, it also protects against adaptive chosen plaintext attacks, where hackers can choose the values they pass to the apparatus 10 and cause an applet to be exported immediately after loading it's parameters.

Optionally, VersaCrypt can change its key material for each VersaCrypt export to further strengthen security and limit key lifetime.

The apparatus 10 also protects against stale data attacks (this is similar to a replayed data attack on networks), where an old value of a VersaCrypt block is given back at a latter time by limiting the number of VersaCrypt blocks, such that the checksums for each block can be maintained in DMEM 18 and compared at load time. The limit for VersaCrypt blocks (applets+sub applets+data segments) is 32 blocks, or 256 bytes in the illustrated apparatus 10.

F. VersaCrypt Block IDs

VersaCrypt block IDs can be any 16 bit value, other than the reserved value of 0. The only restriction is that the bottom 5 bits of the ID must be unique for a given system, since they are used as an index into the various tables for VersaCrypt blocks.

G. VersaCrypt Block Types

There are three different types of VersaCrypt blocks, namely, data segments, VersaCrypt applets, and VersaCrypt sub applets. Data segments are used to store data that can be shared between VersaCrypt applets. They may be exported/ imported by VersaCrypt applets and are not useable by user code. VersaCrypt applets are user callable VersaCrypt functions. They are called via a system call which inserts a call control block into the queue in the VersaCrypt control block, and inserts the VersaCrypt applet into the VersaCrypt run queue (if not already present). VersaCrypt sub applets are VersaCrypt applets, except they are only called by other VersaCrypt applets, and never by the user directly. They are used to segment large applets into smaller sections, although at a large export/import delay.

In many instances the term VersaCrypt applet is used to refer collectively to both VersaCrypt applets and VersaCrypt sub applets. The only real distinction is on who they are intended to be called by, as will be described below. VersaCrypt applets are called as subroutines using normal C calling conventions and must observe standard C register usage. Their stack pointers are initialized to the end of the applet's block, and have its parameter available. VersaCrypt applets must save all non temporary registers they use, like any other C function, as some of them will be used for storing VersaCrypt linkage information.

H. VersaCrypt Data Segment

The data segments are managed by VersaCrypt applets via four systems calls to import and export a data segment and to create and delete data segments. A VersaCrypt applet may have as many as eight data segments loaded at a time, and must explicitly unload them when finished (excluding the parameter to VersaCrypt sub applets). When they are loaded (imported) their format is the same as in external memory (tamper checked region through data), except that they are not encrypted.

It is not valid to keep executable instructions in a VersaCrypt data segment, and the instruction cache is not flushed when VersaCrypt data segments are imported.

It is possible to setup, such that data segments are created and initialized at build time, and loaded with the applets in the boot image so that initialization code is not needed in the applet. It is also possible to make an applet automatically load its data segments, so they need not be explicitly loaded and unloaded, and so they are known to load at a well known address.

VersaCrypt applets are responsible for taking care of any semaphores for shared access to data in a data segment, if multiple VersaCrypt applets are going to be accessing the same data. They can use the disable VersaCrypt preemption flag for this function, provided it does not adversely effect VersaCrypt scheduling.

I. VersaCrypt Applet

The VersaCrypt applets are only called via a system call. This system call enqueues the CallCB into the queue for that VersaCrypt applet, and, if this is its first entry, adds the VersaCrypt applet to the end of the VersaCrypt run queue. The scheduler shares the CPU 54 (16) between multiple tasks, one of which is the single kernel task. The kernel task in turn shares its cycles between user functions, the Secure Kernel, and all the VersaCrypt applets that are ready to run.

Since VersaCrypt applets are preemptable, a single applet that runs for a long time (such as RSA) does not keep other user tasks or VersaCrypt applets from running. When a VersaCrypt applet is entered, it has the CallCB as its only parameter.

Preferably, any true task like a VersaCrypt applet is split into an insecure user task that calls the secure VersaCrypt applet. For instance, conditional access software might have a User portion (that includes an interrupt handler to talk to the smart card) that makes VersaCrypt calls that generate the request to, as well as, processing the results from, the smart card. The user portion could also handle message passing, semaphores, and periodic calls if needed. VersaCrypt cannot hide the external events that cause a secure task to be invoked, but should instead hide the processing of the event.

J. VersaCrypt Sub Applets

The VersaCrypt sub applets are just like regular applets, but are used to break up any VersaCrypt applets that exceed the memory limits. They can only be called via a kernel only system call, and cannot be called directly by user software. When they are called by a VersaCrypt applet (or sub applet), the caller blocks and the sub applet starts executing. If a sub applet is already executing when it is called, an alarm is triggered (this precludes sharing of routines between applets, in most cases, and certain types of recursion). Sub applets are not reentrant. The caller passes ParmID (which is the ID of a data segment) and, when the VersaCrypt sub applet is entered, it has a pointer to this data segment as its only parameter. The data segment is used to both pass parameters and return results.

K. Context Switch Checks

Figure 9:
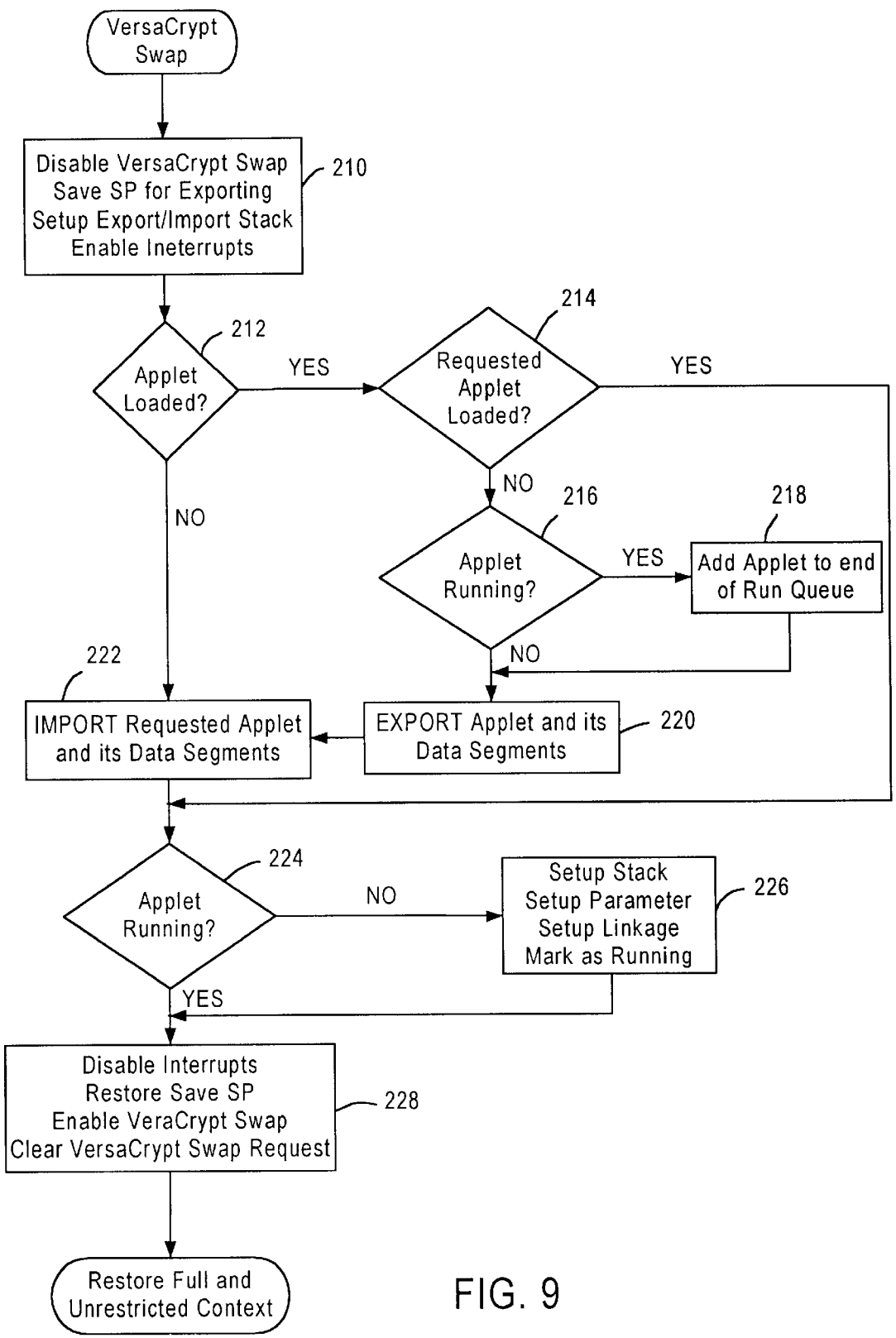
FIG. 9 is a flow chart illustrating the process used by the apparatus to swap applets between an external memory and the DMEM.

Whenever the Secure Kernel performs a context switch to the single kernel task, it performs the following checks (see FIG. 9):

1. If the VersaCrypt Preemption Request flag is set, and the Disable VersaCrypt Preemption flag is clear, and the VersaCrypt Run Queue is not empty then a) set the disable VersaCrypt preemption flag; b) save the current stack pointer, for exporting; c) load the secure kernel's Export/Import stack pointer; and d) enable interrupts (block 210). A Secure Kernel task is now currently running to perform export/import operations.

If an applet is currently loaded (block 212) and is not the desired applet (block 214), it is exported. Specifically, if the applet hasn't finished execution (block 216), it is added to the end of the run queue (block 218). For each data segment loaded, and then for the applet itself: a) the Random Whitening value for export is generated; b) the MAC is calculated and saved in the table in DMEM 18; c) the block is encrypted with whitening; and d) the encrypted, whitened applet is copied from DMEM 18 into SDRAM 24 (block 220). The next applet is then removed from the top of the VersaCrypt run queue (block 222).

If the applet is not currently loaded (block 212), it is imported (block 222). Specifically, the imported applet and each of its data segments are: a) copied from SDRAM 24 into DMEM 18; b) decrypted with whitening; c) the MAC for the decrypted block is calculated and compared with the value in the table in DMEM 18; d) the flags are checked, (i.e., to make sure the blocks are of the expected type, etc.); e) if the imported applet is a sub applet that is not currently running, the first data segment in its table is replaced with its parameter, so it will be loaded; f) the validity of the data segment map for applets and sub applets is checked; and g) the instruction and data caches are flushed.

If, on the other hand, the applet is just starting (block 214 and block 224), its context is initialized: i) its saved stack pointer is setup; ii) its parameter is set to the queued CallCB (for applets) or the data segment (for sub applets); iii) its return register ($31) is set to point into code in the Secure Kernel to handle applet completion (this will also require saving the CallCB (for applets) or the calling applet ID (for sub applets)); and iv) its flags are updated, (i.e., it is now executing) (block 226).

Regardless of which of the above three situations is presented (i.e., applet currently loaded, applet not currently loaded, or applet loaded and just starting), control next disables interrupts; restores the saved stack pointer; and clears the disable VersaCrypt preemption flag and the VersaCrypt preemption request flag (block 228).

Control then restores the Kernel Context, and enters into Kernel Mode. [If no VersaCrypt Applets are runable, this will be a loop that keeps calling the RTOS to sleep for 1 tick.]

L. VersaCrypt Applet's Data Section Format

The format of the data section of a VersaCrypt applet is:

| Bits | Field | Description |
| --- | --- | --- |
| 32 | SP | Saved stack pointer - Used when VersaCrypt is exported. |
| 8x32 | Dsmap | This is the map of data segments that are currently loaded. The first 16 bits of each segment is the segment ID. The second 16 bits is an offset to where it is loaded. The segments are sorted by decreasing offset, with any unused (all 0s) entries at the end. |
| 32n | Applet | This it the VersaCrypt applet: text, data, Bss, and stack. The Bss and stack are initially 0s. The entry point into the VersaCrypt applet is the beginning of this section, and the stack will work down from the end of this section. |

M. VersaCrypt Applet Call Control Block Format

The purpose of the VersaCrypt applet call control block (CallCB) is to have a well defined interface for making user requests of VersaCrypt. This CallCB allows for asynchronous requests, so that user software need not wait for the relatively slow scheduling of VersaCrypt applets, and can queue up multiple requests. Since many security problems crop up at the interface between two tasks running at different security levels, this simplified interface helps minimize the area where certain types of security problems can occur.

| Bits | Field | Description |
| --- | --- | --- |
| 32 | Link | For adding the CallCB into the queue of requests for this applet. |
| 32 | CallBack | A user routine to call when the applet completes. This call back routine is passed the CallCB. |
| n | Parms | These are any parameters passed to the applet and space for returning any results. Although its size is specific to each applet, it is strongly recommended that it is limited. For security reasons, it is important that parameters must be copied into DMEM at the start of the request and that the results be copied back at the end of the request. This is due to the insecure nature of external memory and accesses to it. |

Tamper Checking

In addition to the various tamper checking features described above, the apparatus 10 further implements a method for tamper checking the integrated circuit. The method is implemented upon detection of a reset event. When such an event is detected, the processor 54 (16) is held in a reset state such that the EEPROM 32 cannot be accessed. The EEPROM 32 cannot be accessed when the processor 54 (16) is held in a reset state because the processor must initiate all EEPROM accesses. In the illustrated apparatus 10, all possible circuits including memories are tested by a BIST (Built In Self Test). The processor 54 (16) is held in the reset state during execution of these tests. The processor 54 (16) is only released from the reset state if the tested elements respectively pass the BIST tests. If any of the tested elements fail their respective tests, the apparatus 10 is assumed to have been tampered with and the processor 54 (16) is held in the reset state so that no further instructions can be executed, so that boot-up does not occur, and so that no exposure of sensitive information can occur.

Since the processor 54 (16) is held in a reset state throughout this process, a further facility must be provided for implementing this tamper checking method. In the illustrated embodiment, the tamper checking method is performed by one of the watchdog circuits 88 (see FIG. 3). Thus, the tamper checking method is preferably implemented by hardware and is performed every time a reset condition occurs.

Persons of ordinary skill in the art will appreciate that, besides the reset being used as the BIST test trigger, other events, (for example periodically occurring events), could be used as trigger(s) without departing from the scope or the spirit of the invention. If periodic event(s) are used as trigger(s), the apparatus will preferably isolate and test the possibly effected elements. In addition, persons of ordinary skill in the art will readily appreciate that, in addition to (or instead of) holding the processor in a reset state, other tamper responses can be used without departing from the scope or spirit of the invention. In addition, the processor can be used to initiate and/or run the tests without departing from the scope or spirit of the invention.

The following details concerning the preferred embodiment of the invention should be noted. First, in the preferred embodiment, the apparatus 10 is implemented in a single die.

Also in the preferred embodiment, the processor 16 will have a kernel mode of operation that prohibits user software from accessing sections of the address space, and performing privileged operations. Third, all bus masters besides the processor 16, i.e., DMA, should have a limited view. Preferably, no external bus masters are allowed.

In addition, the address map should be defied such that all secure peripherals fall in the kernel address space, and such that all other peripherals fall in the user address space. Moreover, as will be appreciated by persons of ordinary skill in the art, the system could contain any desired standard or application specific peripherals, without departing from the scope or spirit of the invention.

Furthermore, as will be appreciated by persons of ordinary skill in the art, throughout the preferred embodiment, a hostile posture is taken with respect to all external resources and user supplied parameters. Such resources should be expected to change without notice at unexpected times as a result of attacks. Regular accesses should be considered to be providing information for statistical attacks. All addresses must be checked for validity before use, and all values must be copied to internal memories before authentication and/or use.

Although certain instantiations of the teachings of the invention have been described herein, the scope of coverage of this patent is not limited thereto. On the contrary, this patent covers all instantiations of the teachings of the invention fairly falling within the scope of the appended claims either literally or under the doctrine of equivalents.

What is claimed is:

1. An apparatus for providing a secure processing environment comprising:
    a read/write memory for storing information;
    a first processor cooperating with the read/write memory for reading information therefrom and writing information thereto;
    a cipherer in communication with the read/write memory, the cipherer being configured to selectively decrypt encrypted information into decrypted information and to deliver the decrypted information to the read/write memory for subsequent use by the first processor; and
    an authenticator for authenticating the decrypted information prior to use by the first processor.

2. An apparatus as defined in claim 1 wherein the authenticator re-authenticates decrypted information received from the read/write memory, and the cipherer is configured to selectively encrypt the decrypted, re-authenticated information into re-encrypted information.

3. An apparatus as defined in claim 2 wherein the cipherer returns the re-encrypted information to the read/write memory for subsequent exportation to a storage device.

4. An apparatus as defined in claim 2 wherein the cipherer re-encrypts the decrypted, re-authenticated information such that it differs from its original encrypted form to mask modification information.

5. An apparatus as defined in claim 4 wherein the cipherer employs key-cycling to mask the modification information.

6. An apparatus as defined in claim 4 wherein the cipherer employs a whitening process to mask the modification information, wherein the whitening process employs a whitening key, and wherein the whitening key is cycled.

7. An apparatus as defined in claim 2 wherein authentication data employed to re-authenticate the decrypted information prior to re-encryption is stored in the read/write memory for subsequent use in authenticating the decrypted information.

8. An apparatus as defined in claim 2 further comprising an external memory for selectively storing re-encrypted information.

9. An apparatus as defined in claim 1 wherein the first processor has a kernel mode of operation and a user mode of operation, the kernel mode and the user mode defining separate security cells.

10. An apparatus as defined in claim 9 wherein the first processor executes non-secure software in the user mode of operation and secure software in the kernel mode of operation.

11. An apparatus as defined in claim 1 further comprising a second processor, the second processor being in communication with the cipherer and with the read/write memory to thereby selectively initiate decryption and re-encryption of information stored in the read/write memory.

12. An apparatus as defined in claim 11 wherein the cipherer comprises the authenticator.

13. An apparatus as defined in claim 1 wherein the encrypted information comprises encrypted processor instructions.

14. An apparatus as defined in claim 1 wherein the encrypted information comprises encrypted data.

15. An apparatus as defined in claim 1 wherein the encrypted information is segmented into sections.

16. An apparatus as defined in claim 15 wherein each of the sections is independently encrypted and authenticated.

17. An apparatus as defined in claim 1 further comprising a non-volatile memory and a logic circuit for controlling access to the data contained in the non-volatile memory, the logic circuit selectively accessing the non-volatile memory to determine whether the data contained in the non-volatile memory comprises confidential data by analyzing a property inherent in the accessed data.

18. An apparatus as defined in claim 17 wherein the logic circuit determines whether the data contained in the non-volatile memory comprises confidential data by identifying data blocks in the accessed data having a predetermined characteristic, by counting the identified data blocks, and by comparing the count to a threshold value.

19. An apparatus as defined in claim 18 wherein each of the data blocks comprises a bit, and the predetermined characteristic comprises a predefined logic state.

20. An apparatus as defined in claim 18 wherein each of the data blocks comprises a plurality of bits, and the predetermined characteristic comprises a binary value falling within a range of binary values.

21. An apparatus as defined in claim 17 wherein the logic circuit comprises the first processor.

22. An apparatus as defined in claim 17 further comprising a key isolation circuit directly connecting the logic circuit to the cipherer.

23. An apparatus as defined in claim 22 wherein the non-volatile memory stores a key, and the key isolation circuit delivers the key to the cipherer.

24. An apparatus as defined in claim 22 wherein the logic circuit, the key isolation circuit and the cipherer define a closed system.

25. An apparatus as defined in claim 1 wherein the first processor, the read/write memory, and the cipherer are embedded on an integrated circuit.

26. An apparatus as defined in claim 25 wherein the integrated circuit includes pins for connecting the apparatus to external devices, and further comprising a silencing circuit for selectively disabling the pins to avoid disclosure of sensitive information outside the secure environment.

27. An apparatus as defined in claim 25 further comprising a watchdog circuit adapted to monitor the integrated circuit for tampering.

28. An apparatus as defined in claim 25 further comprising an input for selectively receiving encrypted information from an external source.

29. An apparatus as defined in claim 1 further comprising a memory management unit cooperating with the first processor for maintaining a plurality of security cells.

30. An apparatus as defined in claim 1 wherein the cipherer comprises a crypto-module.

31. An apparatus as defined in claim 1 wherein the authentication of the decrypted information is performed by authenticating the corresponding encrypted information.

32. For use with an external memory for storing encrypted information, the external memory having a first storage capacity, an integrated circuit for providing a secure processing environment comprising:
    a volatile memory having a second storage capacity, the second storage capacity being less than the first storage capacity;
    import/export means for selectively importing and exporting encrypted information between the external memory and the volatile memory;
    cipher means for decrypting encrypted information received from the volatile memory into decrypted information within the secure environment and for encrypting the decrypted information back into encrypted information within the secure environment; and a processor for processing the decrypted information within the secure environment, the processor cooperating with the import/export means to selectively import and export decrypted information between the external memory and the volatile memory to avoid exceeding the second storage capacity.

33. An integrated circuit as defined in claim 32 wherein the cipher means encrypts information such that encrypted information corresponding to decrypted information has a first form when imported from the external memory and a second form different from the first form when exported to the external memory even when the corresponding decrypted information is unchanged.

34. An integrated circuit as defined in claim 33 wherein the decrypting means decrypts encrypted information using a first whitening key and encrypts decrypted information using a second whitening key different from the first whitening key.

35. An integrated circuit as defined in claim 34 further comprising a cryptographically strong pseudo random number generator that generates the second whitening key.

36. An integrated circuit as defined in claim 32 further comprising means for authenticating the decrypted information within the secure environment.

37. An integrated circuit as defined in claim 36 wherein the authenticating means authenticates the decrypted information after importation from the external memory and re-authenticates the decrypted information prior to exportation to the external memory.

38. For use in an integrated circuit for performing secure operations, a method for tamper checking the integrated circuit comprising the steps of:

detecting an event;

executing a built in self test on at least one element of the integrated circuit to determine if a tamper has occurred; and if the built in self test indicates a tamper has occurred, placing a restriction on at least one operation of the integrated circuit.

39. A method as defined in claim 38 further comprising the steps of:

holding a processor associated with the integrated circuit in a reset state such that a predefined memory storing key material cannot be accessed;

if the at least one element passes the built in self test, releasing the processor from the reset state; and if the at least one element fails the built in self test, holding the processor in the reset state.

40. A method as defined in claim 38 wherein the at least one element comprises a memory.

41. A method as defined in claim 38 wherein the at least one element comprises a logic circuit.

42. A method as defined in claim 38 wherein the event comprises a reset event.

43. An apparatus comprising:

a non-volatile memory; and a logic circuit for controlling access to data contained in the non-volatile memory, the logic circuit selectively accessing the non-volatile memory to determine whether the data contained in the non-volatile memory comprises confidential data by analyzing a property inherent in the accessed data.

44. An apparatus comprising:

a non-volatile memory;

a logic circuit for controlling access to data contained in the non-volatile memory, the logic circuit selectively accessing the non-volatile memory to determine whether the data contained in the non-volatile memory comprises confidential data by analyzing a property inherent in the accessed data; and a cipherer for encrypting information and/or decrypting encrypted information using a key stored in said non-volatile memory; and a key isolation circuit directly connecting the logic circuit to the cipherer for delivering the key from the non-volatile memory to the cipherer.

45. An apparatus as defined in claim 44, wherein the logic circuit, the key isolation circuit, and the cipherer define a closed system.

46. An apparatus for metering use of encrypted information in a secure processing environment, comprising:

a read/write memory;

a processor cooperating with the read/write memory for reading information therefrom and writing information thereto;

a cipherer configured to decrypt the encrypted information into decrypted information and to deliver the decrypted information to the read/write memory for subsequent use by the processor, the cipherer further being configured to re-encrypt the decrypted information received from the read/write memory into re-encrypted information after the decrypted information has been used by the processor; and a monitor for measuring an amount of time elapsed between the decrypting of the encrypted information into decrypted information and the re-encrypting of the decrypted information into re-encrypted information by the cipherer, thereby metering use of the encrypted information.

47. An apparatus as defined in claim 46, wherein the encrypted information comprises encrypted processor instructions.

48. An apparatus as defined in claim 46, wherein the encrypted information comprises encrypted data.

49. An apparatus as defined in claim 46, wherein the encrypted information is imported from an external storage device and the re-encrypted data is exported to the external storage device.

50. An apparatus as defined in claim 46, wherein the cipherer decrypts encrypted information using a first whitening key and re-encrypts decrypted information using a second whitening key different from the first whitening key.

* * * * *